United States Patent [19]
Ozaki

[11] Patent Number: 5,574,802
[45] Date of Patent: Nov. 12, 1996

[54] METHOD AND APPARATUS FOR DOCUMENT ELEMENT CLASSIFICATION BY ANALYSIS OF MAJOR WHITE REGION GEOMETRY

[75] Inventor: Masaharu Ozaki, Sunnyvale, Calif.

[73] Assignees: Xerox Corporation, Stamford, Conn.; Fuji Xerox Co., Ltd., Tokyo, Japan

[21] Appl. No.: 315,857

[22] Filed: Sep. 30, 1994

[51] Int. Cl.⁶ .................................................. G06K 9/34
[52] U.S. Cl. ........................... 382/176; 358/462; 382/240
[58] Field of Search .................................... 382/173, 176, 382/177, 180, 240, 317, 209; 358/453, 462

[56] References Cited

U.S. PATENT DOCUMENTS

| | | | |
|---|---|---|---|
| 4,698,779 | 10/1987 | Holden et al. | 382/9 |
| 4,876,728 | 10/1989 | Roth | 382/21 |
| 4,887,302 | 12/1989 | Urushibata | 382/9 |
| 4,907,285 | 3/1990 | Nakano et al. | 382/48 |
| 5,046,114 | 9/1991 | Zobel | 382/9 |
| 5,185,813 | 2/1993 | Tsujimoto | 382/9 |
| 5,272,764 | 12/1993 | Bloomberg et al. | 382/9 |
| 5,335,298 | 8/1994 | Hevenor et al. | 382/9 |
| 5,430,808 | 7/1995 | Baird et al. | 382/176 |

OTHER PUBLICATIONS

"Page Segmentation By White Streams", T. Pavlidis et al., First International Conference on Document Analysis and Recognition, Sep. 30–Oct. 2, 1991, St. Malo, France.

"Page Segmentation and Classification", T. Pavlidis et al., CVGIP: Graphical Models and Image Processing, vol. 54, No. 6, Nov., pp. 484–496, 1992.

"Image Segmentation by Shape-Directed Covers", Baird et al., 10th Intl. Conference on Pattern Recog., Jun. 16–21, 1990, pp. 820–825.

"A Prototype Document Image Analysis System For Technical Journals", Nagy et al., Computer, Jul., 1992 pp. 10–21.

Primary Examiner—Joseph Mancuso
Attorney, Agent, or Firm—Oliff & Berridge

[57] ABSTRACT

A system for logically identifying document elements in a document image using structural models includes assistant function for users to describe the structural models, a geometric relationship comparator for comparing geometric relationships in a document to the geometric relationships in a structural model, a matching system for determining which structural model matches the document image, and a logical tag assigning system for assigning logical tags to the document elements of the document image based on the matching structural model. The method for logically identifying the document elements in the document image using structural models comprises identifying the major white regions in the document image, using geometric relationships between the major white regions in the document image, identifying a structural model which matches the document image, and assigning logical tags to the document elements in the document image based on the matching structural model.

19 Claims, 34 Drawing Sheets

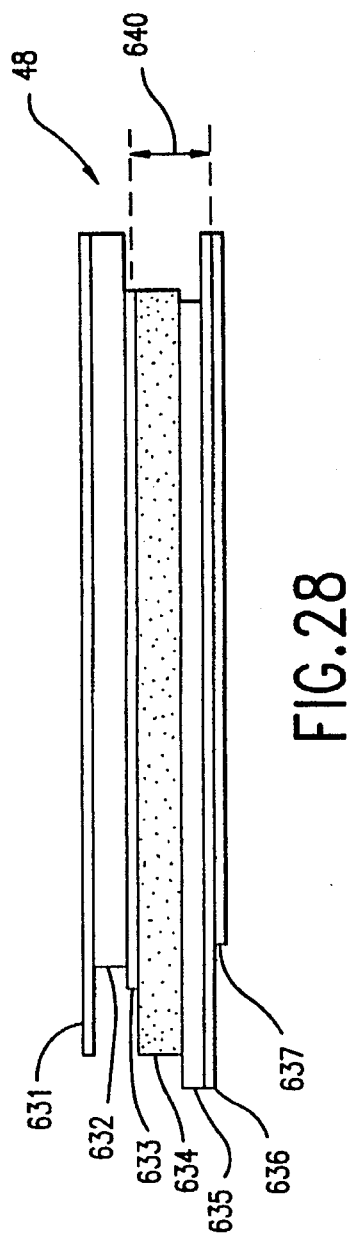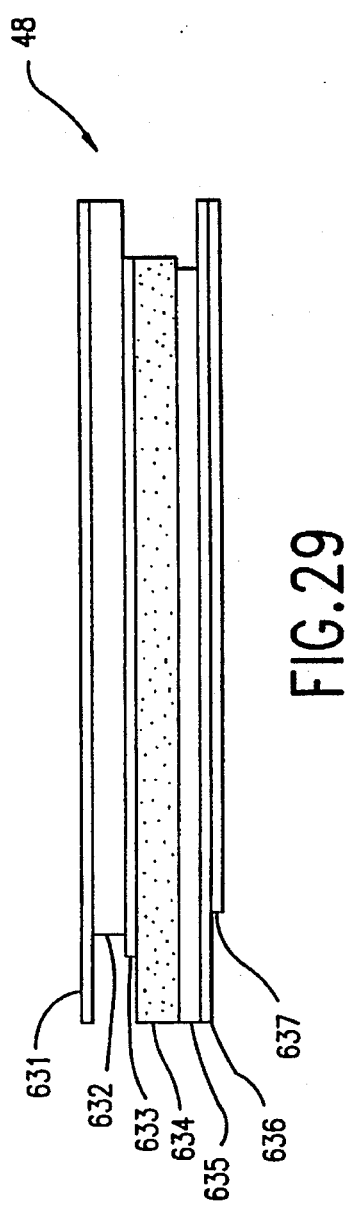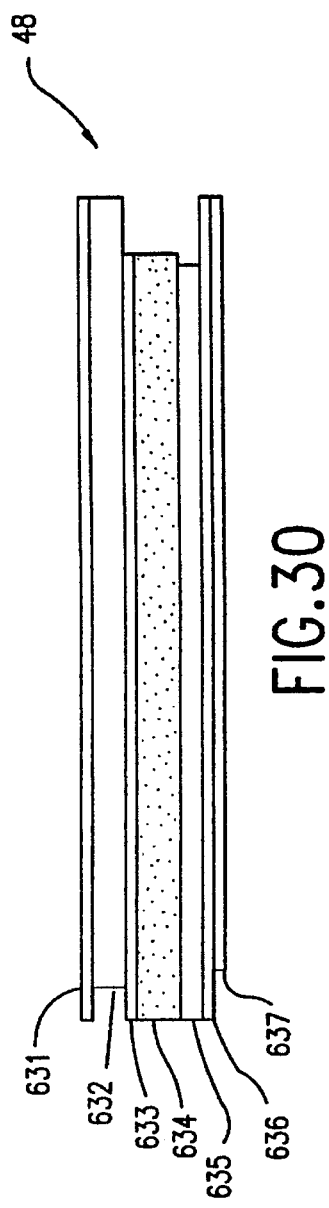

```
BEGINDEF                                    BEGINDEF
NAME: COVERPAGE-OF-REPORT                   NAME: DOUBLE-COLUMN
TYPE: PAGE                                  TYPE: ELEMENT
ELEMENTS:                                   ELEMENTS:
     HEADER       TEXT  :                        RIGHT-COLUMNCOLUMN :
     PAGE-NUMBER  TEXT  :                        LEFT-COLUMN COLUMN :
     TITLE        TEXT  :
     AUTHORS      TEXT  :                   RELATIONSHIPS:
     BODY-TEXT    DOUBLE-COLUMN :                [RIGHT-COLUMN LEFT-COLUMN]
                                                  (LEFT-RIGHT 16 18)
RELATIONSHIPS:                                    TOP-ALIGNED
     [HEADER PAGE-NUMBER]                         HAS-SAME-WIDTH ;
        (LEFT-RIGHT 300 380) ;
     [HEADER TITLE]                         ENDDEF
        (ABOVE-BELOW 12 18) ;
     [PAGE-NUMBER TITLE]
        (ABOVE-BELOW 12 18) ;
     [TITLE AUTHORS]
        (ABOVE-BELOW 16 20)
        CENTERED ;
     [AUTHORS BODY-TEXT]
        (ABOVE-BELOW 24 36) ;
        CENTERED ;

ENDDEF
```

FIG. 37

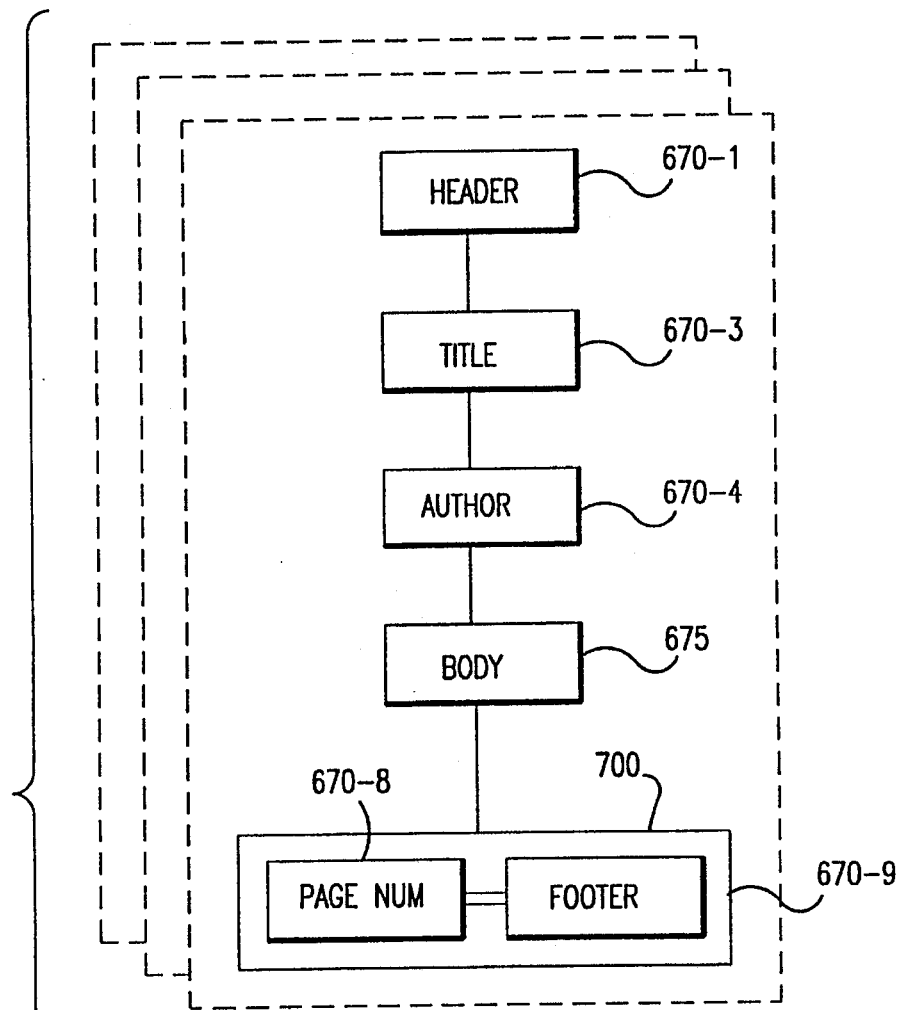
TOP-LEVEL REGULAR EXPRESSION PATTERN=
'[a]* [a-c] [a]* [e-g] [a-d]* [d-e] [a]* [a-b] [a]*'
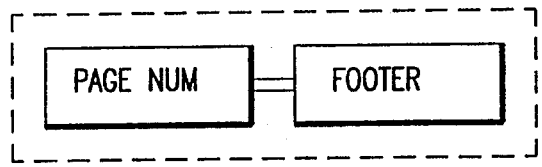
THE SECOND-LEVEL REGULAR EXPRESSION PATTERN=
'[a-l] *[l-o] [a-l] *'
FIG.45

METHOD AND APPARATUS FOR DOCUMENT ELEMENT CLASSIFICATION BY ANALYSIS OF MAJOR WHITE REGION GEOMETRY

BACKGROUND OF THE INVENTION

1. Field of the Invention

This invention generally relates to a method and apparatus for classifying the document elements of a document by analyzing the relational geometry of the major white regions surrounding the document elements. In particular, this invention relates to a method and apparatus for logically identifying document elements in a document image using structural models.

2. Related Art

Conventional methods for logically identifying elements in a document image are outlined in Nagy et al., "A Prototype Document Image Analysis System for Technical Journals", pp. 10–21, Computer, July 1992. However, no method for logically identifying elements segmented only by major white regions has been disclosed. A method for extracting text regions by analyzing the white space in a document image has been disclosed by Baird et al., "Image Segmentation By Shape-Directed Covers", "10th International Conference of Pattern Recognition", pp. 820–825, 16–21 June 1990. However, the method disclosed by Baird does not recognize logical structure or clearly identify stopping rules for document element extraction.

Other methods have been disclosed for segmenting document elements in a document image, but none analyze the white areas in a document image, segment document elements by extracting and analyzing major white regions or logically identify such segmented document elements. White regions are those areas of a document which contain no connected components.

SUMMARY OF THE INVENTION

This invention provides a system for users to develop structural models and describe geometric relationships between document elements using information relating to the size and orientation of major white regions separating the document elements in document images.

This invention also provides a system for determining which structural model matches an actual document image so document elements of the actual document image can be assigned logical tags corresponding to logical tags of elements in the matching structural model.

Document elements are segmented according to the definitions of elements in the matching structural model. Major white regions are rectangular areas of white space having a predetermined minimum size. Document elements are also rectangular areas, which contain information such as text, graphics, etc, separated by the white spaces.

Using this invention, it is not necessary to analyze portions of a document image containing document elements to determine which connected components form a coherent group, i.e., a document element. An image on a document is scanned to create an electronic or digital representation of the image. Major white regions are rectangular areas of white space having a predetermined minimum size. Document elements are areas containing information such as text, graphics, etc. and are separated from one another by the major white regions. Areas containing document elements and separated from other areas by a predetermined size of white space are assumed to be separate document elements.

Examples of such document elements in a document image are the title of a document, the authors, a footnote, a body of text, and so on. Those extracted white regions are further processed by comparing their geometrical interrelationships with the geometrical interrelationships of model documents. The structural models are descriptions of the specific page structures which are provided by the users off-line and in advance to the actual process of tagging. The logical tags associated with the document elements of the closest model document, based on the comparison, are associated with the corresponding document elements of the document to logically identify the document elements.

Other objects and advantages of the present invention will become apparent from the specification and claims of the present invention.

BRIEF DESCRIPTION OF THE DRAWINGS

The preferred embodiments of this invention will be described in detail with reference to the drawings, in which:

FIGS. 28–30 graphically illustrate how ends of groups of primitive white areas are trimmed and merged;

FIG. 37 shows an exemplary structural model of a model document;

FIG. 45 is a most similar model document to the sample document of FIG. 44;

DESCRIPTION OF THE PREFERRED EMBODIMENT

Figure 1:
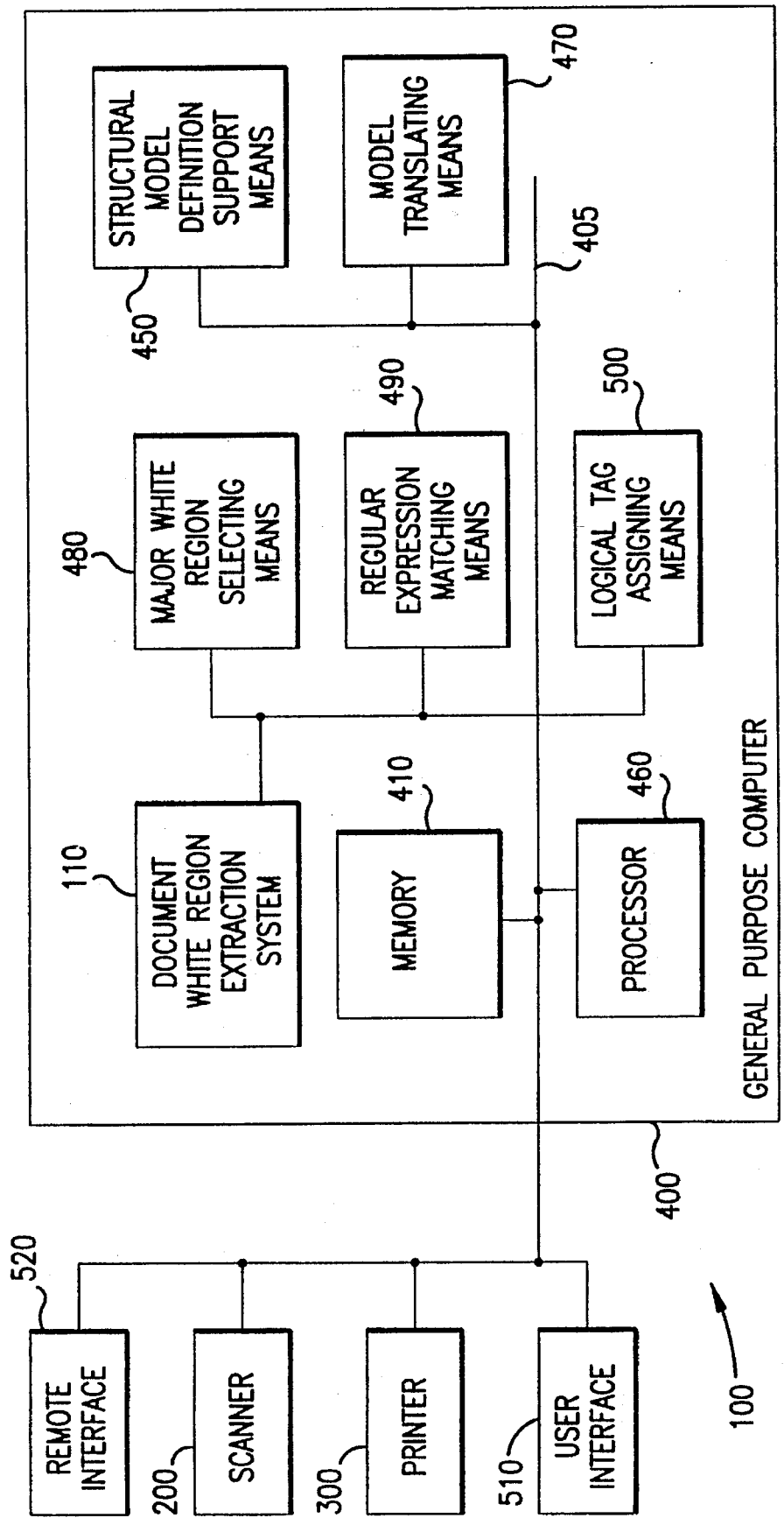
FIG. 1 is a block diagram of a preferred embodiment of the document element identification system.

FIG. 1 shows a first preferred embodiment of a document element identification system 100. The document element identification system 100 includes a document white region extraction system 110, a memory 410, a processor 460, a structural model definition support means 450, a model translating means 470, a major white region selecting means 480, a regular expression matching means 490, and a logical tag assigning means 500, which are all connected together by a bus means 405. In addition, a scanner 200, a printer 300, a user interface 510, and a remote interface 520 are also connected to the bus means 405. As shown in FIG. 1, the document element identification system 100 is preferably implemented on a general purpose computer 400. However, the document element identification system 100 can also be implemented on a limited purpose computer, a hardwired electronic circuit such as a discrete element circuit, or an integrated circuit, or the like.

Figure 2:
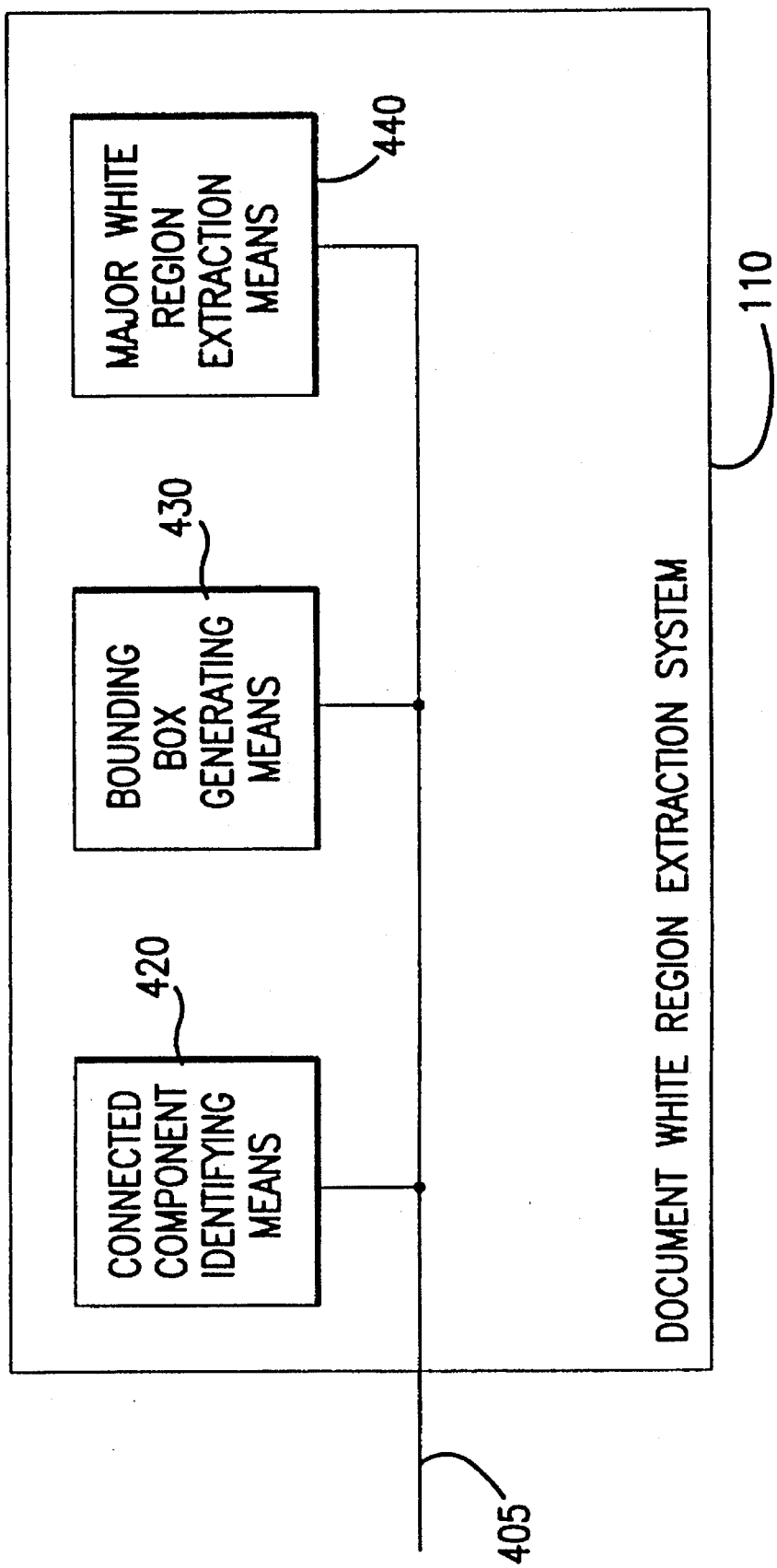
FIG. 2 is a block diagram of a preferred embodiment of the document white region extraction system of the document element identification system of FIG. 1.

FIG. 2 shows a first preferred embodiment of the document white region extraction system 110 of the document element identification system 100. As shown in FIG. 2, the document white region extraction system 110 comprises a connected component identifying means 420, a bounding box generating means 430, and a major white region extraction means 440, all which are connected to the bus means 405. Document image data is first input into the connected component identifying means 420 from the scanner 200 or the memory 410. The memory 410 may be located within the general purpose computer 400 or without in the form of a disk drive, CD-ROM, EPROM, and the like, as well known in the art. Likewise, the document image data from the scanner 200 may be first stored in the memory 410 before being input to the connected component identifying means 420. The document image data is input into the connected component identifying means 420 in the form of a binary image, or a plurality of bits of a digital signal, each bit representing whether a particular pixel of the document image is "on" or "off."

Figure 4:
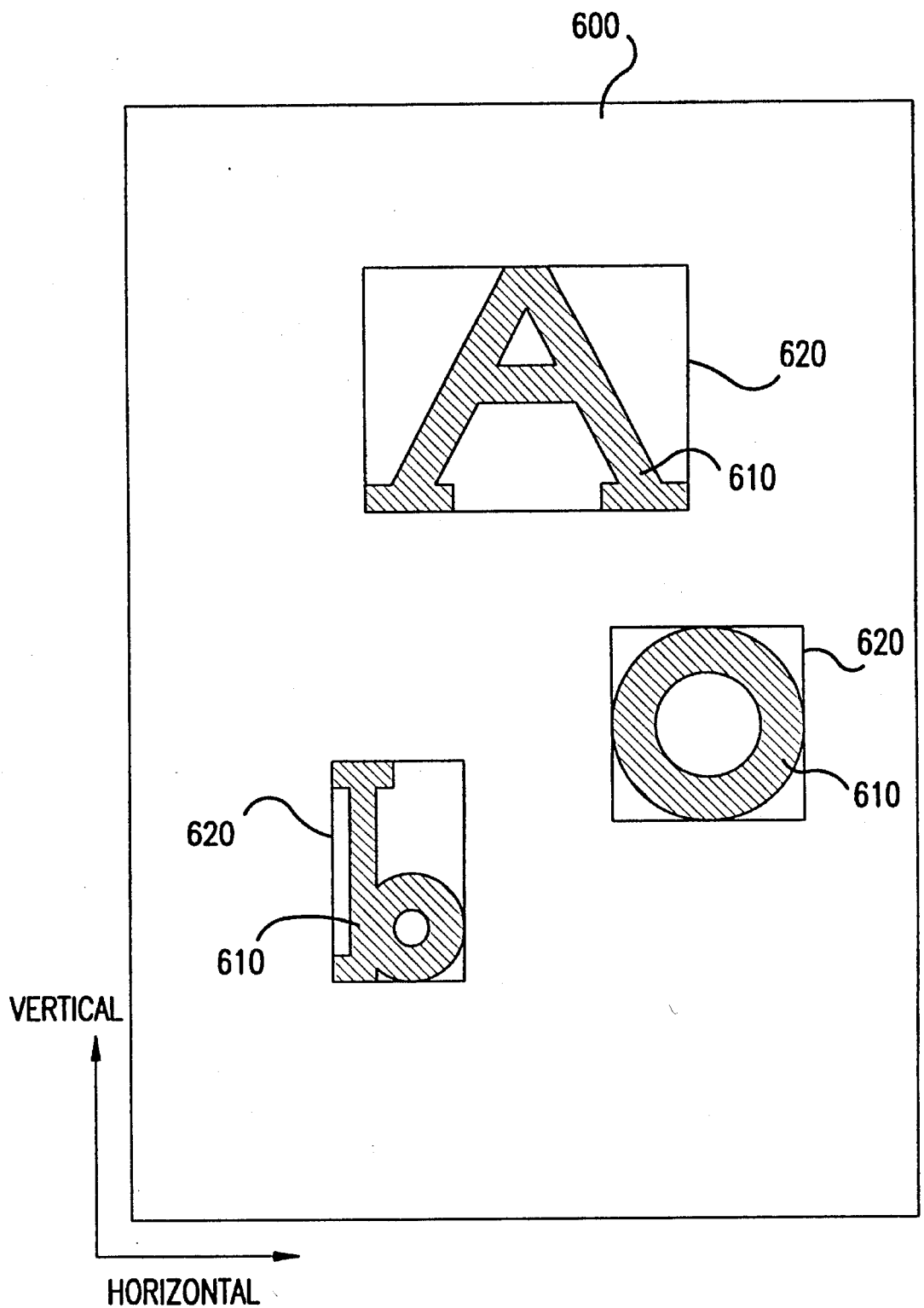
FIG. 4 shows a sample document image.

After the connected component identifying means 420 receives the document image data, the connected components identifying means 420 identifies all of the connected components in the document image. FIG. 4 shows an exemplary document image 600. The connected components 610 are found within the document image 600. Each connected component 610 comprises a series of adjacent "on" (i.e., black) pixels surrounded by "off" (i.e., white) pixels. Systems for identifying connected components 610 in document images 600 are well known in the art.

Once the connected components 610 of the document image 600 are identified, the bounding box generating means 430 generates a bounding box 620 for each connected component 610. The bounding box 620, as well known in the art, is a minimum-sized rectangular box which completely encloses the corresponding connected component 610, as shown in FIG. 4. Systems for generating bounding boxes 620 from connected components 610 are also well known in the art.

Figure 5:
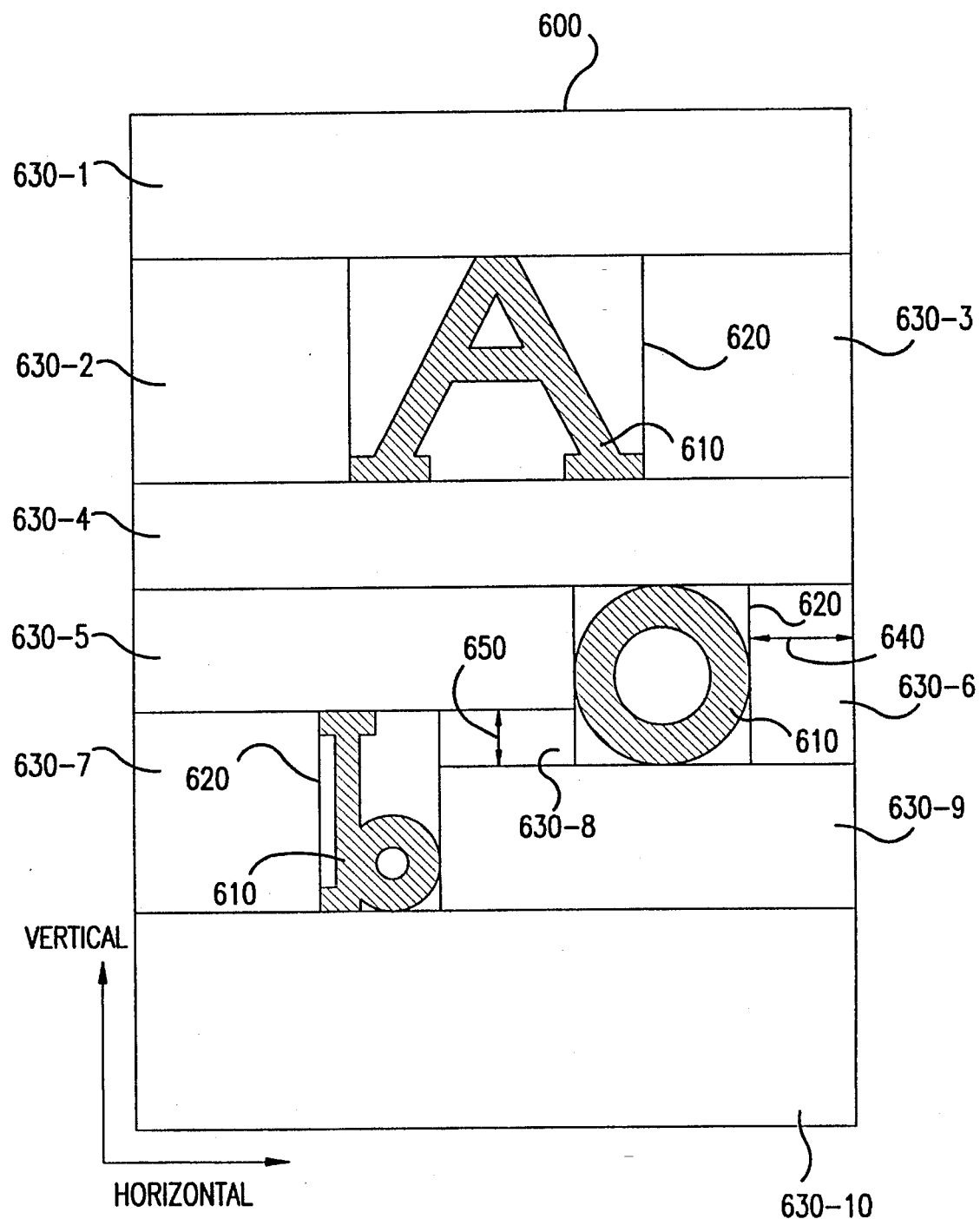
FIG. 5 shows a document image with horizontal primitive white areas extracted.
Figure 6:
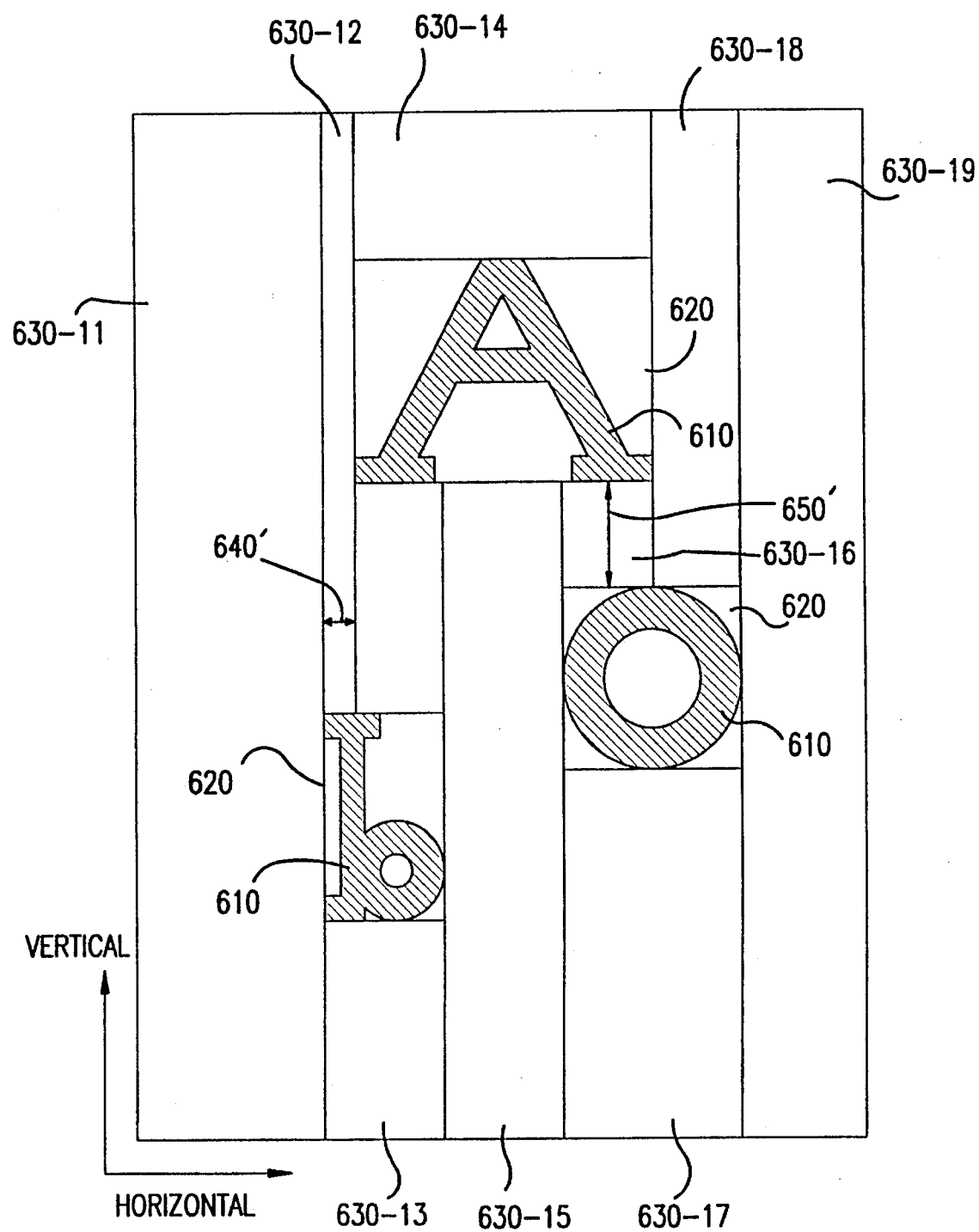
FIG. 6 shows a document image with vertical primitive white areas extracted.

The document image data with bounding box information is sent to the major white region extraction means 440, which extracts major white regions 660 in the vertical and horizontal directions of the document image 600, as shown in FIGS. 5 and 6.

Figure 3:
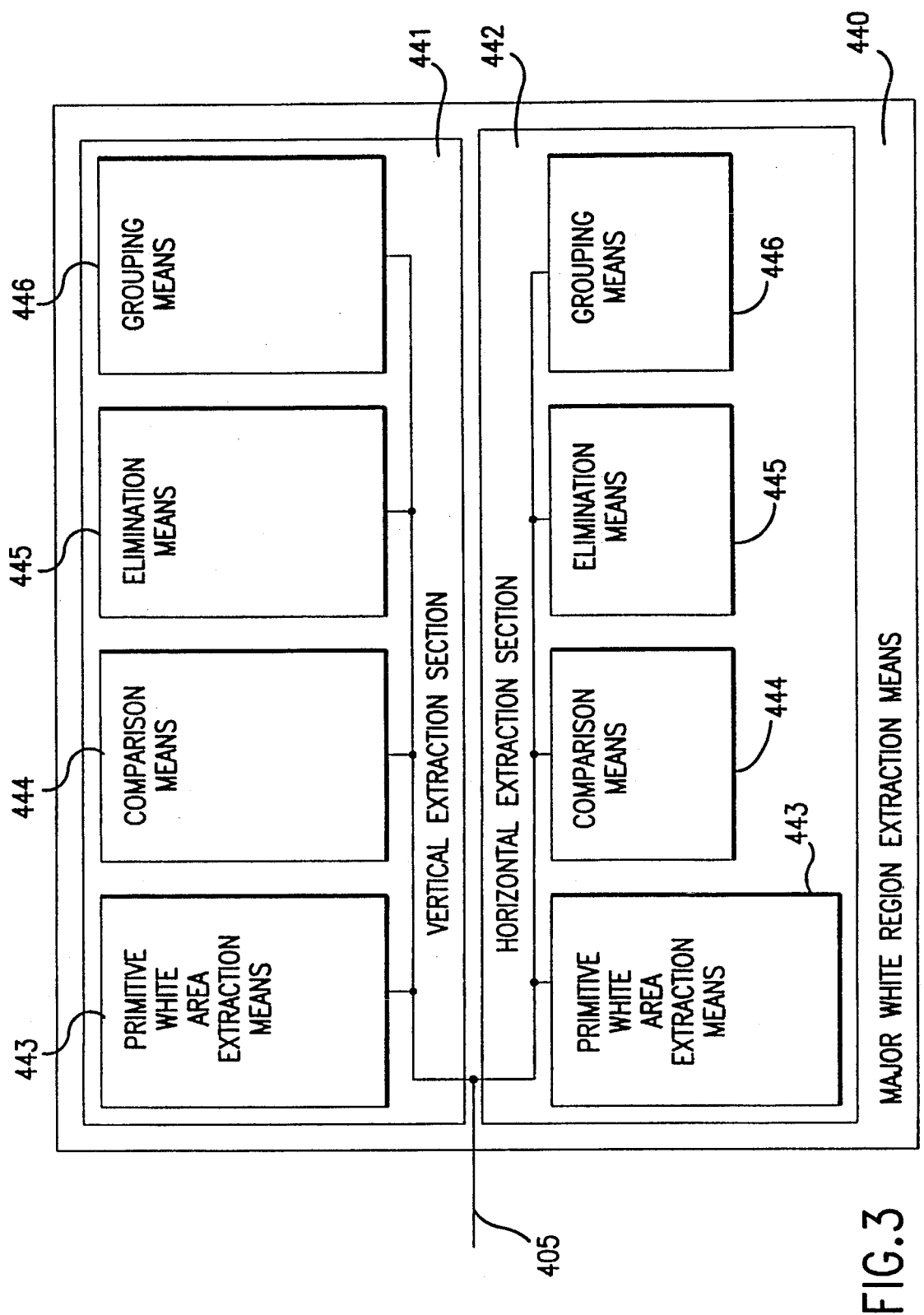
FIG. 3 is a block diagram of a preferred embodiment of the major white region extraction means.

In a preferred embodiment of the document white region extraction system 110, the major white region extraction means 440 is divided into two sections, a vertical extraction section 441 and a horizontal extraction section 442, as shown in FIG. 3. Each of the vertical extraction section 441 and the horizontal extraction section 442 comprises a primitive white area extraction means 443, a comparison means 444, elimination means 445, and a grouping means 446, each of which is connected to the bus means 405. Both the vertical extraction section 441 and the horizontal extraction section 442 contain identical components and operate in a similar fashion. As shown in FIG. 5, the horizontal extraction section 442 first extracts primitive white areas 630-1 to 630-10 and assembles major white regions 660 in the horizontal direction. Likewise, as shown in FIG. 6, the vertical extraction section 441 first extracts primitive white areas 630-11 to 630-19 and assembles major white regions 660 in the vertical direction.

Assembling horizontal major white regions 660 is done by grouping and merging adjacent ones of the horizontal primitive white areas 630-1 to 630-10 into single horizontal grouped primitive white areas 630' according to specific rules. Likewise, assembling vertical major white regions 660 is done by grouping and merging adjacent ones of the vertical primitive white areas 630-11 to 630-19 into single vertical grouped primitive white areas 630'. After the grouping and merging of the vertical and horizontal primitive white areas is complete, horizontal primitive white areas 630 and 630' having a width greater than a width threshold 640 and a height greater than a height threshold 650 and vertical primitive white areas 630 and 630' having a height greater than a height threshold 650' and a width greater than a width threshold 640' are identified as the major white regions 660.

Figure 7:
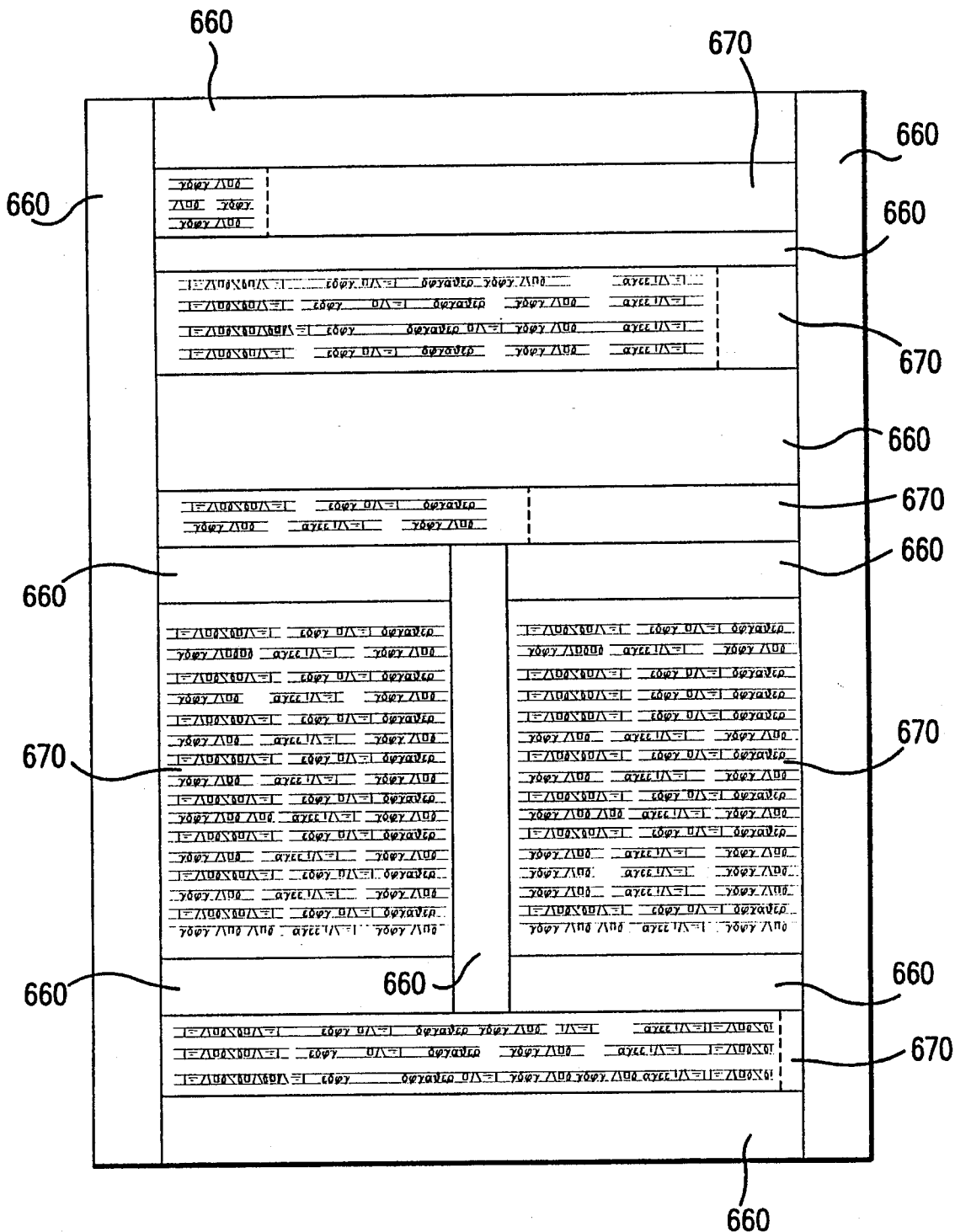
FIG. 7 shows a document image with major white regions extracted.

As shown in FIG. 7, the identified major white regions 660 surround and separate the document elements 670 from each other. Thus, the size and orientation of the major white regions can be used to define the logical structure of the document. In this way, the text or graphic areas can be generally identified and logical tags can be associated with these areas without having to actually extract and analyze the document elements.

Once the document white area extraction system 110 identifies the major white regions, the major white region selecting means 480 selects various ones of the major white regions. The regular expression matching means 490 compares a character string generated from the selected major white regions to the regular expressions of one or more structural models. The logical tag assigning means 500 assigns logical tags to the areas between the major white regions based on the matching structural model.

Figure 8:
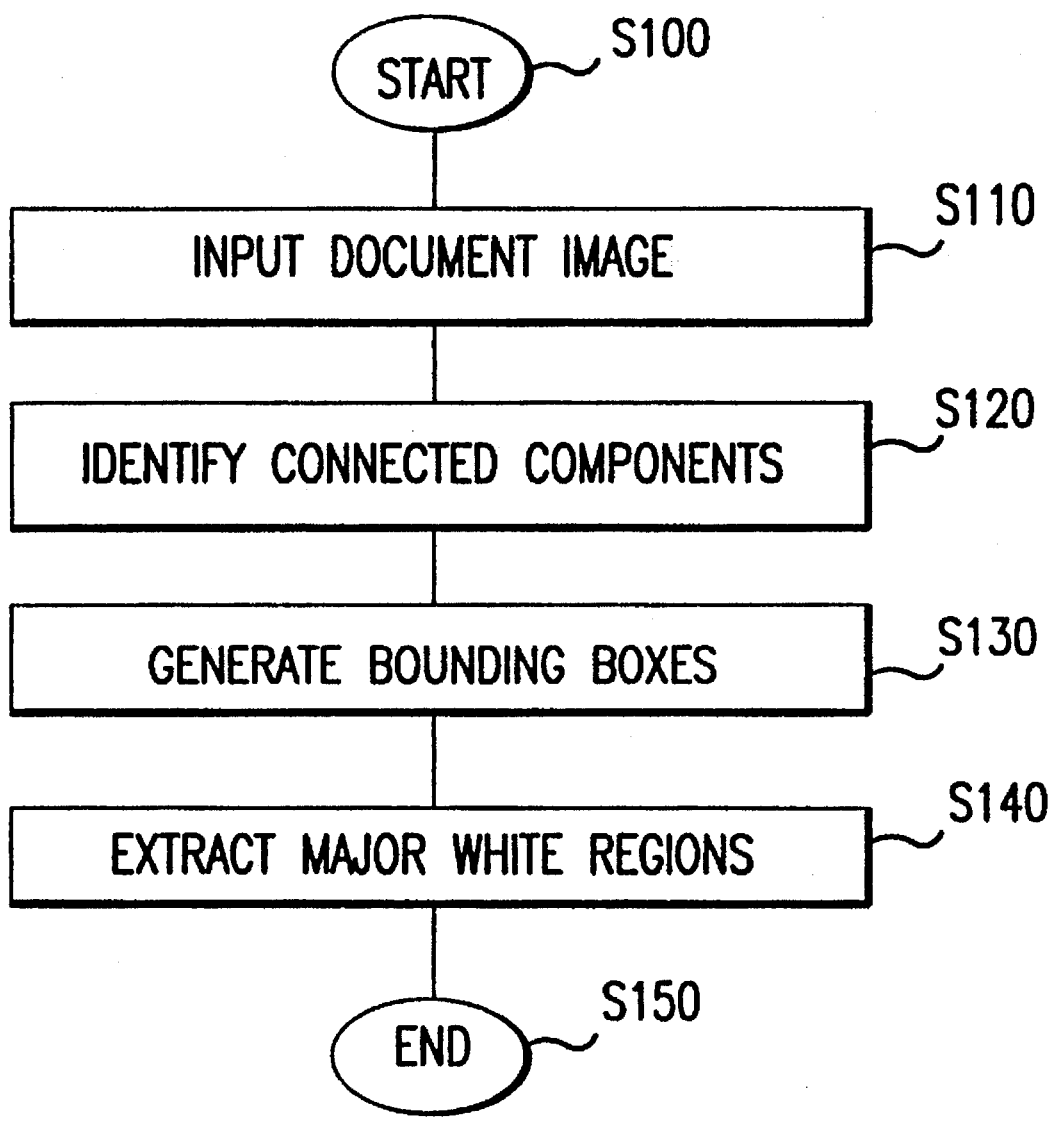
FIG. 8 is a flow chart of one embodiment of the method for extracting major white regions and document elements.

FIG. 8 outlines one preferred embodiment of the method for extracting the major white regions 660. First, after starting in step S100, in step S110 the document image 600 is input. The input document image 600 has a number of document elements 670. In step S120, the connected components 610 of the document image 600 are identified. Next, in step S130, a bounding box 620 is generated for each of the connected components 610 identified in step S120. In step S140, the major white regions 660 are extracted. Then, in step S150, the process ends.

Figure 9:
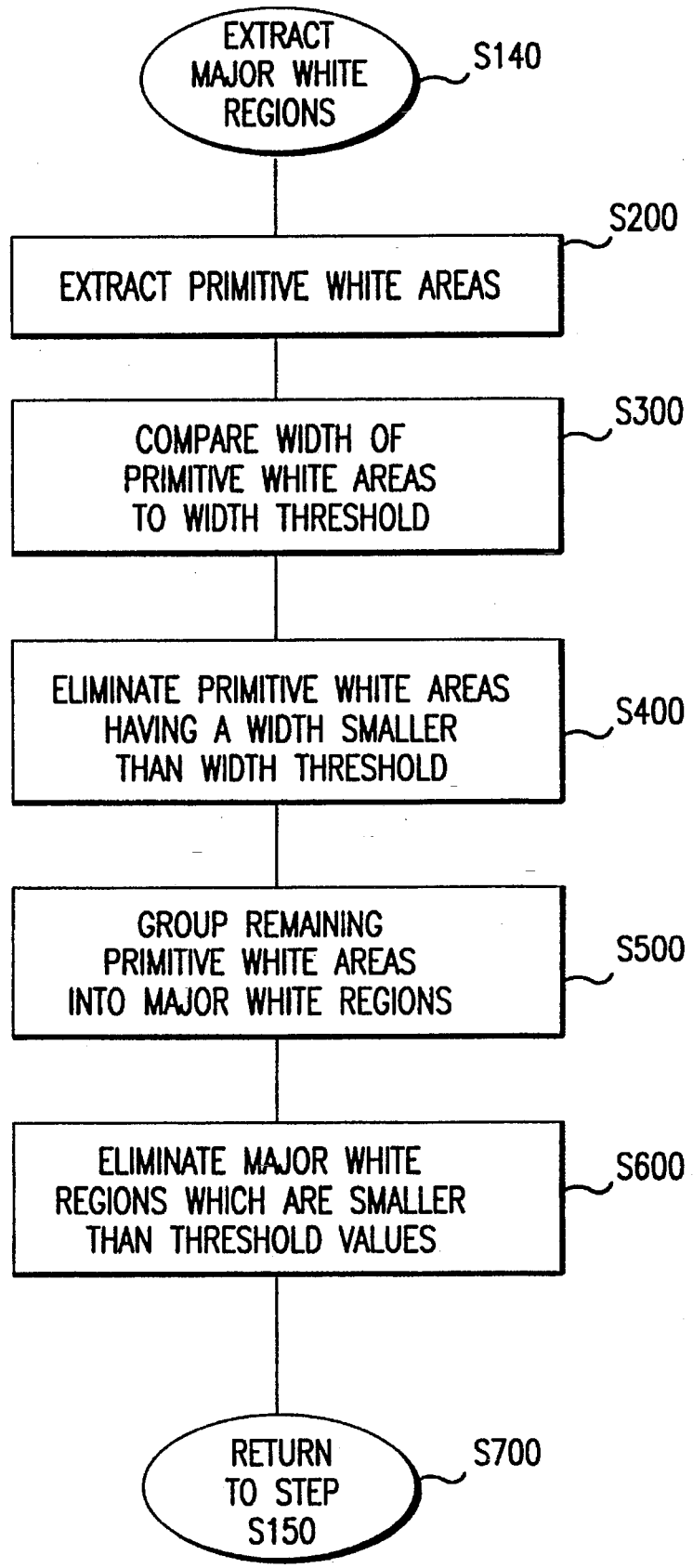
FIG. 9 is a flow chart of one embodiment of the method for extracting major white regions.

FIG. 9 outlines a first preferred embodiment of the major white region extraction process of step S140. In step S200, the primitive white areas 630 are extracted. As shown in FIG. 5, the primitive white areas 630 are rectangular-shaped areas of white space between the bounding boxes 620. Next, in step S300, the height and width of each of the horizontal primitive white areas 630 is compared to a width threshold 640, and the height of each vertical primitive white area 660 is compared to a height threshold 650'. The width threshold 640 in the horizontal direction is preferably set to one-third of the length of the document image 600 in the horizontal direction. The height threshold 650 in the horizontal direction is set to a value greater than the line spacing of the text in the document image. The height threshold 650' in the vertical direction is preferably set to one-third of the length of the document image 600 in the vertical direction. The width threshold 640' in the vertical direction is set to a value greater than the line spacing in the text in the document image.

In step S400, the horizontal primitive white areas 630 having widths smaller than the width 640 threshold and the vertical white areas 630 having heights smaller than the height threshold 650' are eliminated. In step S500, the remaining primitive white areas 630 are grouped and the major white regions 660 are established. Finally, in step S600, those major white regions 660 which have at least one of their vertical or horizontal extents which is less than the corresponding vertical or horizontal threshold are eliminated. Alternately, only those major white regions 660 which have both their vertical and horizontal extents less than the corresponding thresholds are eliminated. Then, in step S700, control returns to step S150.

Figure 10A:
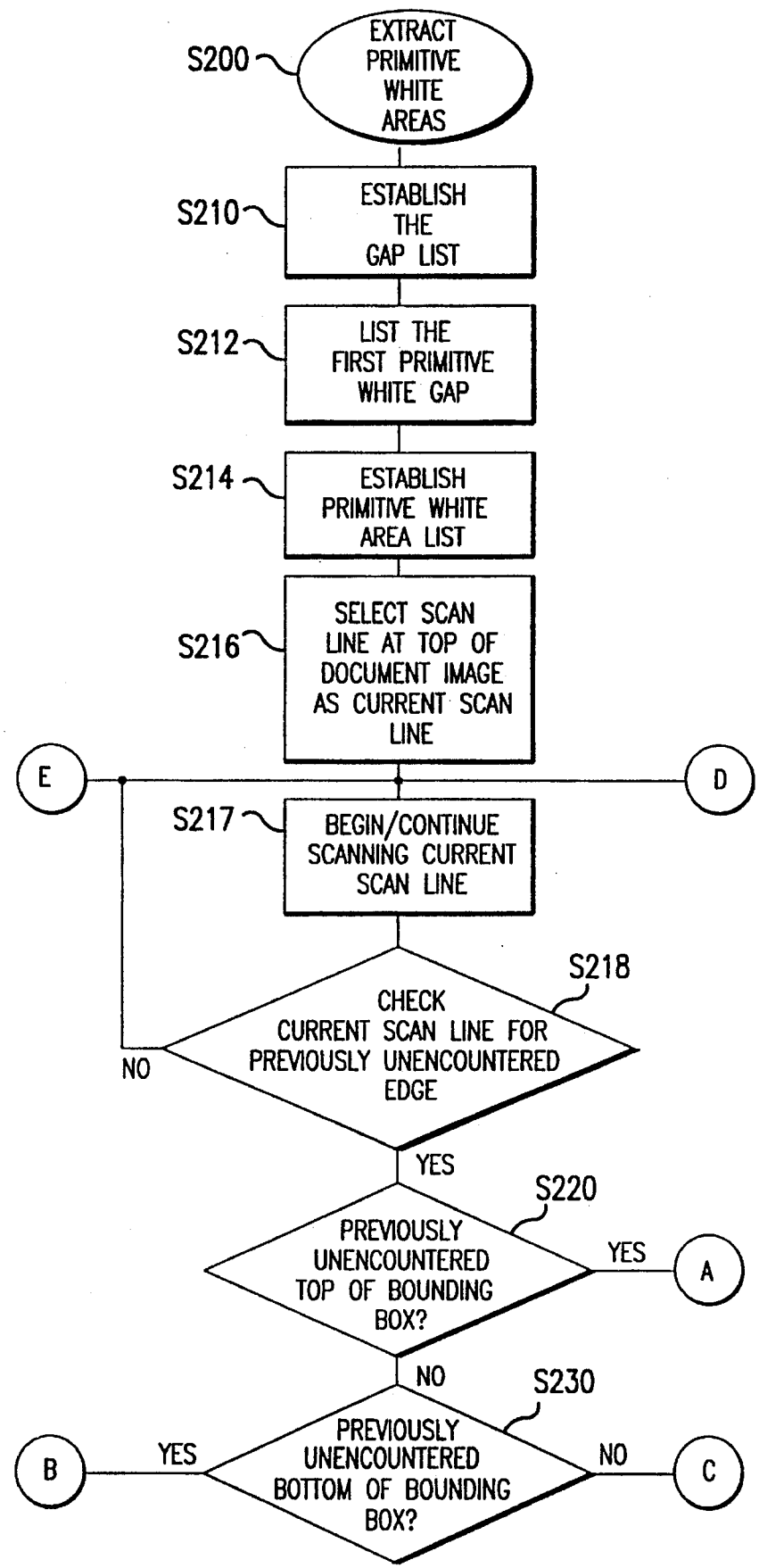
FIGS. 10A–B are a flow chart of one embodiment of the method for extracting primitive white areas.
Figure 10B:
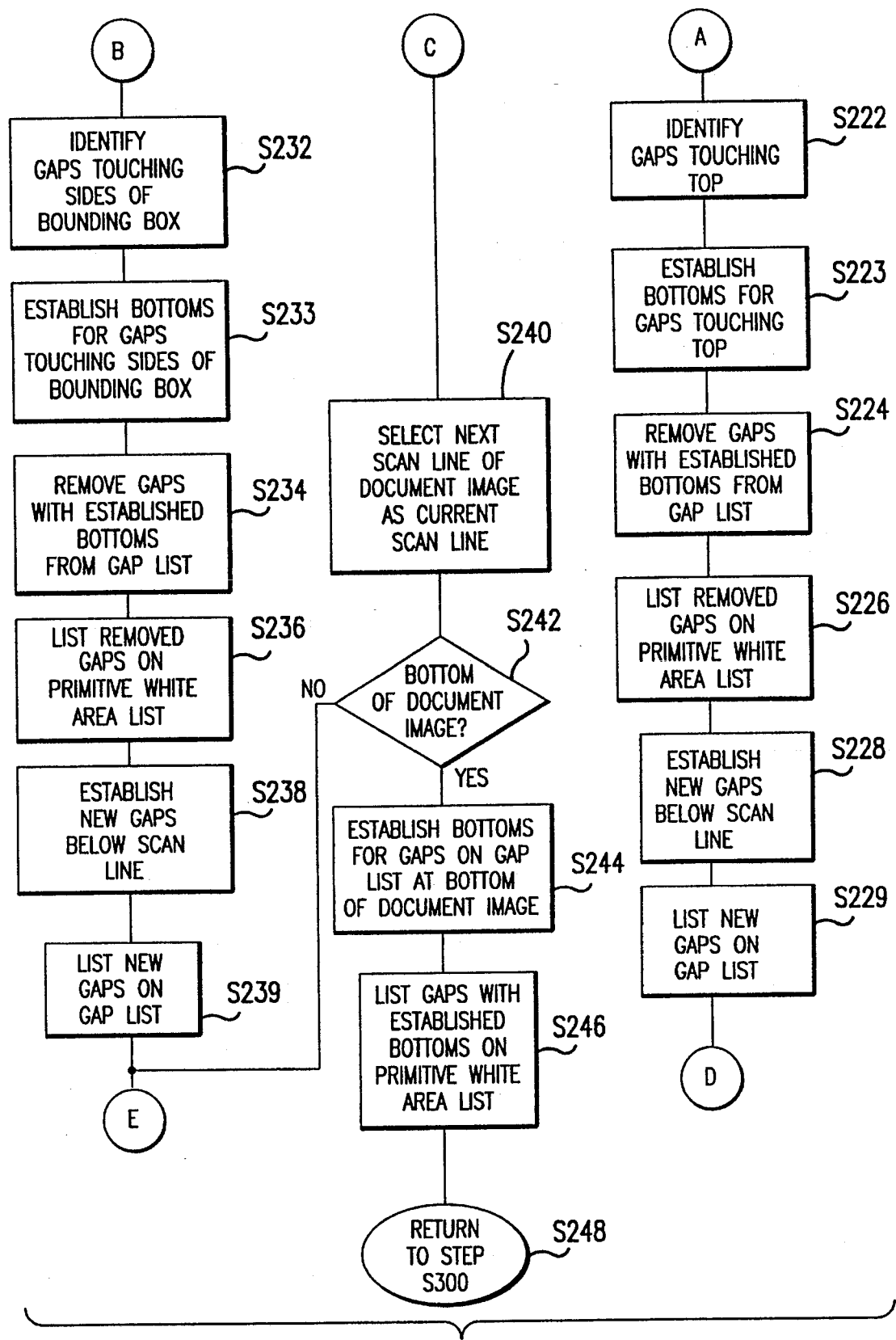

FIGS. 10A–B outline a first preferred embodiment of the horizontal primitive white area extraction process of step S200. The vertical primitive white area extraction process is identical to the horizontal white area extraction process, except that the left and right edges are used instead of the top and bottom edges. In step S210, a gap list is established. In step S212, the gap list is set to initially contain a first primitive white gap 680. The primitive white gaps 680 are potential primitive white areas 630 which have a top and left and right sides established, but do not yet have a bottom established. The first primitive white gap 680 initially listed on the gap list has a top at the top of the document image 600, a left side at the far left side of the document image 600, and a right side at the far right side of the document image 600. In step S214, a primitive white area list is established as initially empty.

In step S216, the current scanline 1000 is located at the top of the document image 600. In step S217, scanning along the current scanline 1000 is begun from left to right. In step S218, the scanline 1000 is checked to determine if an edge of a bounding box or the edge of the document image 600 has been encountered. If an edge has been encountered, control continues to step S220. Otherwise, control returns to step S217 for further scanning of the current scanline 1000.

Figure 11:
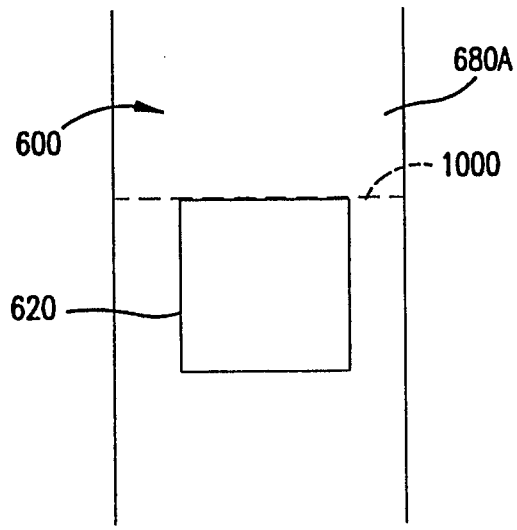
FIG. 11–14 graphically illustrate various ways primitive white areas are formed and primitive white gaps are located when the top of a bounding box is encountered in the scanline.

In step S220, if the edge encountered is a previously unencountered top of one of the bounding boxes 620, control jumps to step S222. In step S222, as shown in FIG. 11, the primitive white gap 680-A in the gap list which touches the top edge of the bounding box 620 is identified. There may be one or more such primitive white gaps 680-A. In step S223, a bottom for each primitive white gap 680-A which touches the top edge of the bounding box 620 is established. In step S224, the primitive white gaps 680-A are removed from the gap list. In step S226, the primitive white gaps 680-A removed from the gap list are placed on the primitive white gap list as primitive white areas 630.

Figure 12:
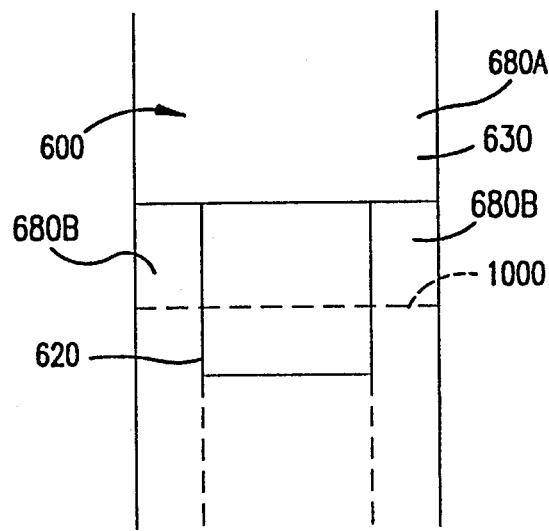
Figure 13:
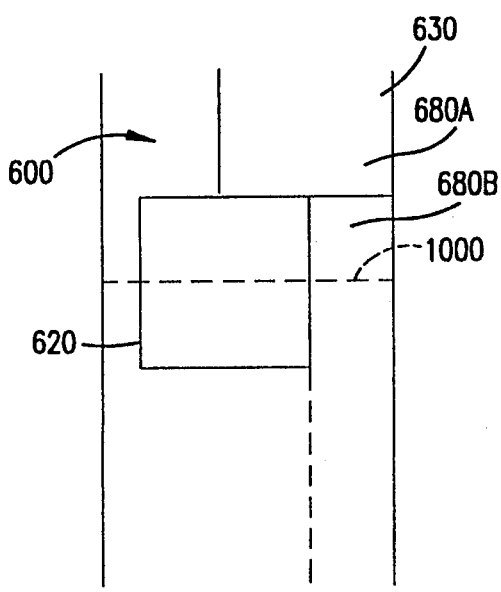
Figure 14:
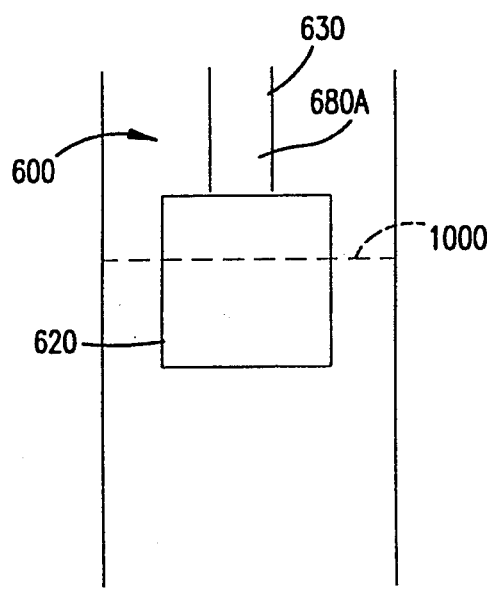

Next, as shown in FIG. 12, in step S228, the new primitive white gaps 680-B having a top located along the same line as the top edge of the bounding box 620 and a side adjacent to the side of the bounding box 620 are established, as shown in FIG. 12. As shown in FIGS. 13 and 14, the top edge of the previously unencountered bounding box may intersect one or both of the vertical edges of the primitive white gaps 680-A. In this case, there will be none, or only one, new primitive white gap 680-B added to the gap list. In step S229, the new primitive white gaps 680-B are listed on the gap list. Then, control returns to step S217 for further scanning along the current scanline 1000.

Scanning the current scanline 1000 is continued in step S217. If another previously unencountered top edge of one of the bounding boxes 620 is encountered, steps S222–S229 described above are repeated.

If, in step S220, the encountered edge is not another previously unencountered top edge of one of the bounding boxes 620, control continues to step S230. In step S230, if the edge encountered is a previously unencountered bottom edge of a bounding box 620, control continues to step S232. In step S232, the primitive white gaps 680-B which touch the sides of the bounding box 620 whose bottom edge has been located are identified. Generally, there will be at most two such gaps 680-B, although there could be fewer. Rarely, if one side of the bounding box 620 is flush with an edge of the document image 660 or another bounding box 620, there will only be one gap 680-B. In step S233, a bottom is established for each primitive white gap 680-B touching a side of the bounding box 620. In step S234, those primitive white gaps 680-B having newly established bottom edges are removed from the gap list. In step S236, the primitive white gaps 680-B are placed on the primitive white area list as primitive white areas 630. In step S238, new primitive white gaps 680-C having a top along the same line as the bottom edge of the newly encountered bounding box 620 and left and/or right sides established at sides of other bounding boxes 620 or at the far left and/or right sides of the document image 600 are established. In step S239, the newly established primitive white gaps 680-C are listed on the gap list. Then, control returns to step S217 for further scanning along the current scanline 1000.

FIGS. 13–17 show a few of the possibilities which may occur when the top or the bottom of the bounding box 620 is encountered in the scanline 1000. FIG. 13 shows a primitive white gap 680-A touching the top of the bounding box 620 and extending only to the right of the right side of the bounding box 620. A bottom for the primitive white gap 680-A is established at the top of the bounding box 620 and a new primitive white gap 680-B is established to the right of the bounding box 620 having a top along the same line as the top of the bounding box 620. FIG. 14 shows a primitive white gap 680-A touching the top edge of a bounding box 620, but not extending to either the left or right sides of the bounding box 620. A bottom for the primitive white gap 680-A is established at the top of the bounding box 620 but no new primitive white gaps 680-B are established.

Figure 15:
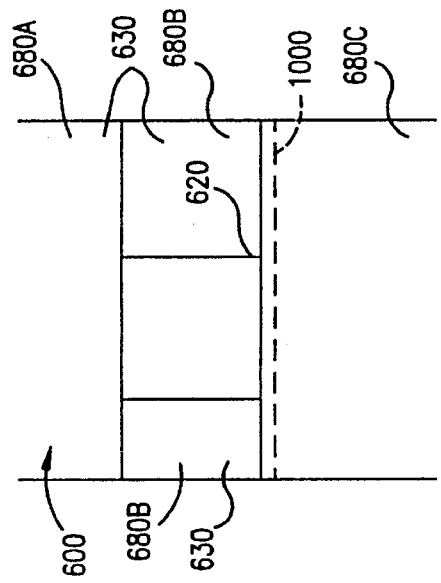

FIG. 15 shows the bottom of a bounding box 620 being encountered in the scanline 1000. Primitive white gaps 680-B are located on either side of the bounding box 620 and touch the sides of the bounding box 620. Therefore, bottoms are established for the primitive white gaps 680-B on either side of the bounding box 620 and the primitive white gaps 680-B having newly established bottoms are removed from the gap list and listed on the primitive white area list as primitive white areas. A new primitive white gap 680-C is established below the bounding box 620 bottom, having a top located along the same line as the bottom of the bounding box 620. This new primitive white gap 680-C is listed on the gap list.

Figure 16:
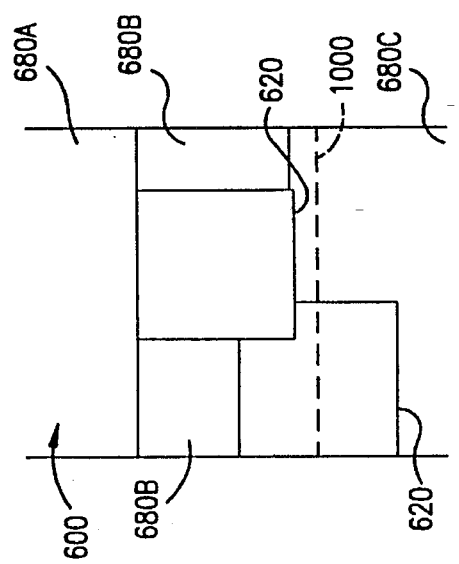

FIG. 16 shows a bottom of a bounding box 620 being encountered in the scanline 1000, with a primitive white gap 680-B located to the right of the bounding box 620. A bottom for the primitive white gap 680-B located on the right of the bounding box 620 is established along the same line as the bottom of the bounding box 620, establishing a new primitive white area. A new primitive white gap 680-C having a top along the same line as the bottom of the bounding box 620, a left side located along the right side of a second bounding box 620 and a right side located along the far right edge of the document image 600 is established.

Figure 17:
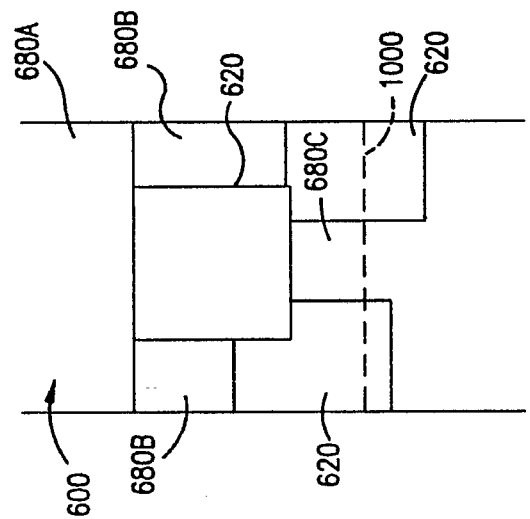
FIGS. 15–17 graphically illustrate various ways primitive white areas are formed and primitive white gaps are located when the bottom of a bounding box is encountered in the scanline.

FIG. 17 shows the scanline 1000 encountering a bottom of a bounding box 620, with no primitive white gaps 680-B touching the sides of the bounding box 620. A new primitive white gap 680-C is established having a top at the bottom of the bounding box 620, a left side located along the right side of a second bounding box 620 and a right side located along the left side of a third bounding box 620.

Scanning in the scanline 1000 is continued until the right edge of the document image is reached. If the edge detected in step S218 is not a top edge or a bottom edge, control jumps through steps S220 and S230 to step S240. In step S240, the next scanline down the document image becomes the current scanline 1000. Control then continues to step S242, where the current scanline 1000 is checked to see if it coincides with the last scanline of the document image. If so, control continues to step S244, where bottoms for all of the primitive white gaps 680A, 680B, and 680-C remaining on the gap list are established at the bottom of the document image 600. In step S246, new primitive white areas 630 are listed on the primitive white area list corresponding to the primitive white gaps 680 having bottoms at the bottom of the document image 600. Then, in step S248, control returns to step S300.

Figure 18A:
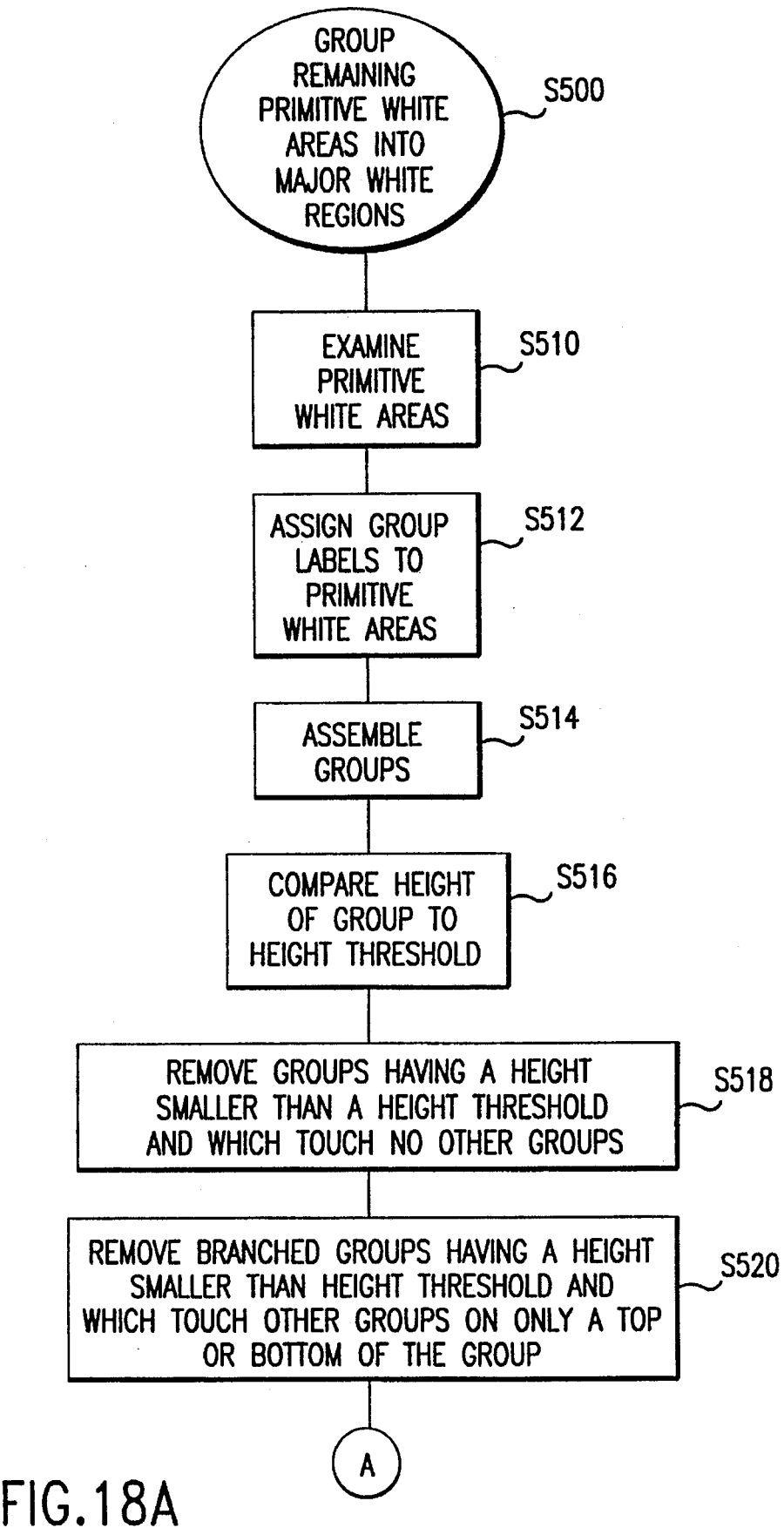
FIGS. 18A–B are a flow chart of one embodiment of the method for grouping remaining primitive white areas into major white regions.
Figure 18B:
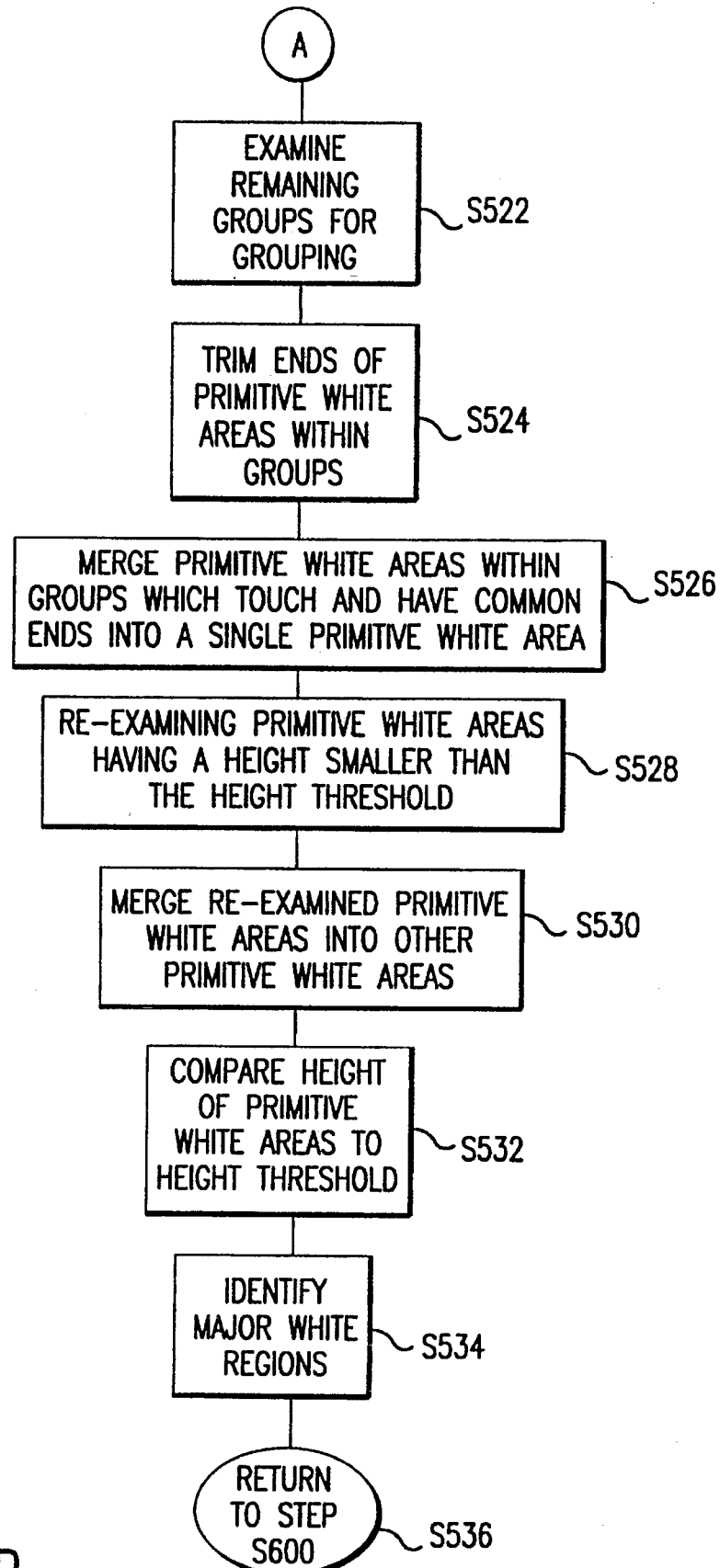

FIGS. 18A–B outline one preferred embodiment for the process for grouping the primitive white areas into major white areas of step S500.

Figure 19:
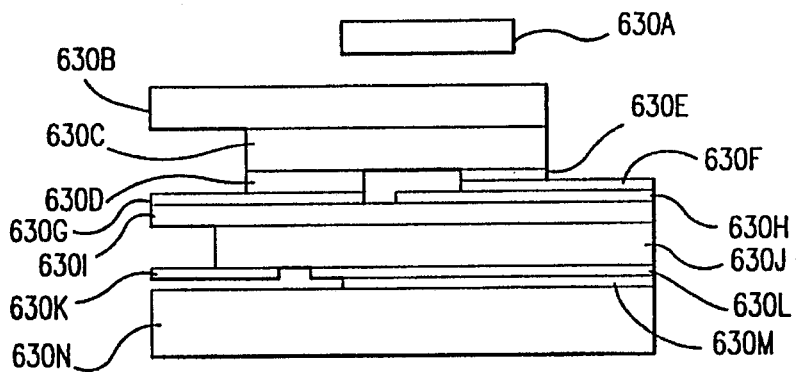
FIGS. 19–24 graphically illustrate various ways primitive white areas are labeled, removed and grouped.
Figure 20:
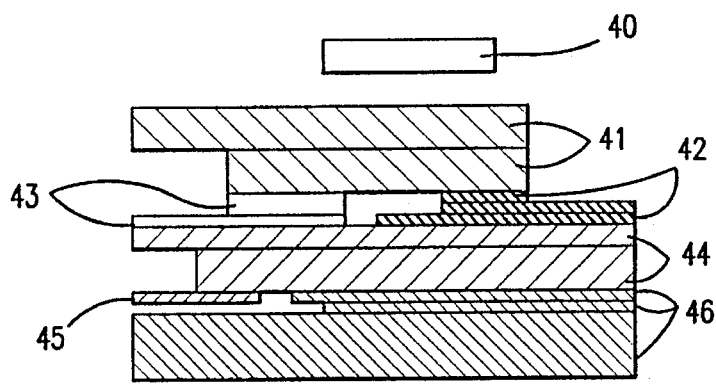

First, in step S510, each of the primitive white areas 630, which remain after eliminating the too-small primitive white areas in step S400, is examined. FIG. 19 shows a number of primitive white areas 630A to 630N remaining after all of the too-small primitive white areas are removed. In step S512, group labels are appended to each group of one or more of the primitive white areas 630A–630N. The primitive white areas 630A–630N are grouped so that primitive white areas which uniquely touch each other are in the same group. As shown in FIG. 20, the primitive white areas 630A–630N are grouped into six distinct groups 40–46.

Figure 21:
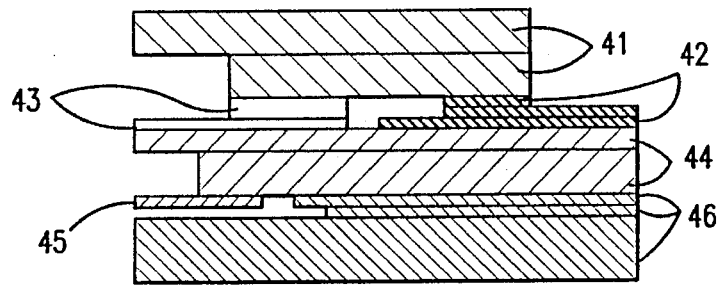
Figure 22:
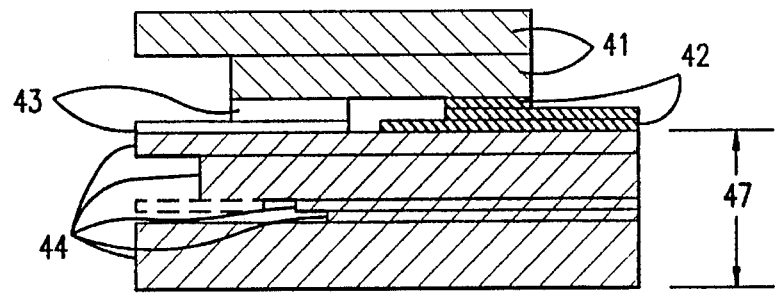

In step S514, after the group labels are assigned to the primitive white areas 630A–630N, groups of primitive white areas 630 having the same group label are gathered into a single group 41'446, as shown in FIG. 20. Next, in step S516, for horizontal groups, the height 650 of each horizontal group 40–46 is compared to the height threshold 650. The height 47 of a group is the size of the group in a direction perpendicular to the direction of each primitive white area's 630 width, as shown in FIG. 21. Thus, for vertical groups the "height" 47 of a group is the size of the group in the horizontal direction and the height 47 of the vertical group is compared to the width threshold 640'. In a preferred embodiment of the invention, the height threshold 650 or 640' is set to a value greater than the line spacing of the text in the document image 600.

In step S518, a group which has a height 47 smaller than the height threshold 650 or 640' and touches no other group, is removed. This is the case with group 40 of FIG. 20. In step S520, branched groups which have a height 47 smaller than the height threshold 650 or 640' and touch other groups only on one surface (i.e., only on either the bottom of the group or the top of the group) are removed. This is the case for group 45 of FIG. 21. In step S522, after removing isolated and branched groups which are smaller than the height threshold 650 or 640', the remaining groups 41–44 and 46 are examined to determine if the number of remaining groups can be reduced by combining two or more of the groups 41–44 and 46.

In step S524, the ends of primitive white areas which have a height smaller than the height threshold are trimmed off. This is shown in FIGS. 28–30 and described in greater detail below.

Figure 23:
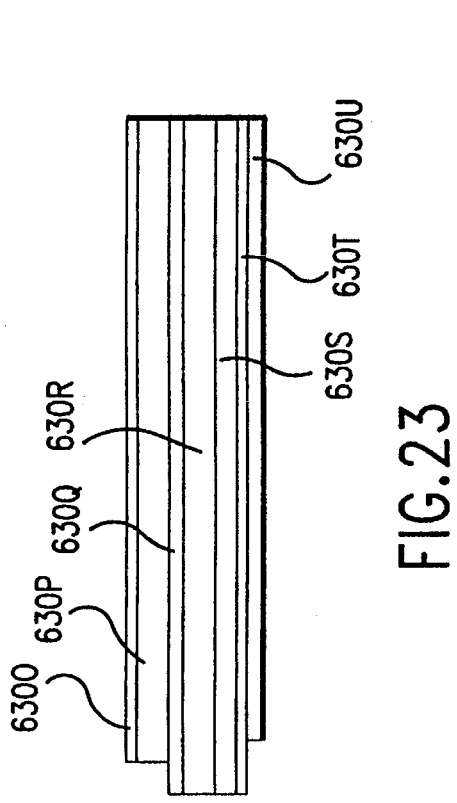
Figure 24:
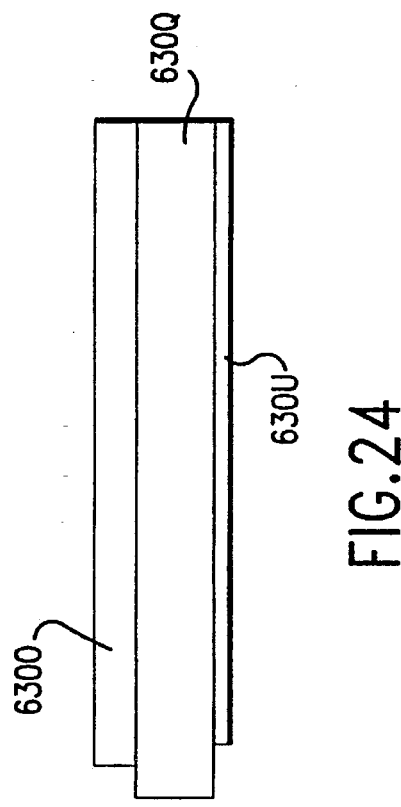

In step S526, the primitive white areas 630 within a group which touch and have common left and right edges are merged into a single primitive white area 630. As shown in FIGS. 23 and 24, primitive white areas 630O and 630P, and 630Q, 630R, 630S and 630T, each have common left and right edges. The seven primitive white areas in the three groups are merged into three primitive white areas 630O, 630Q and 630U as shown in FIG. 24.

In step S528, the removed primitive white areas 630 whose heights 47 are smaller than the height threshold 650 are then reexamined to determine if some of these reexamined primitive white areas 630 can be, in step S530, merged back into one of the remaining primitive white areas 630.

In step S532, the height 47 of each remaining primitive white area 630 is compared to the height threshold 650 or 640'. In step S534, primitive white areas 630 which have a height 47 greater than the height threshold 650 or 640' are determined to be major white regions 660.

Figure 25:
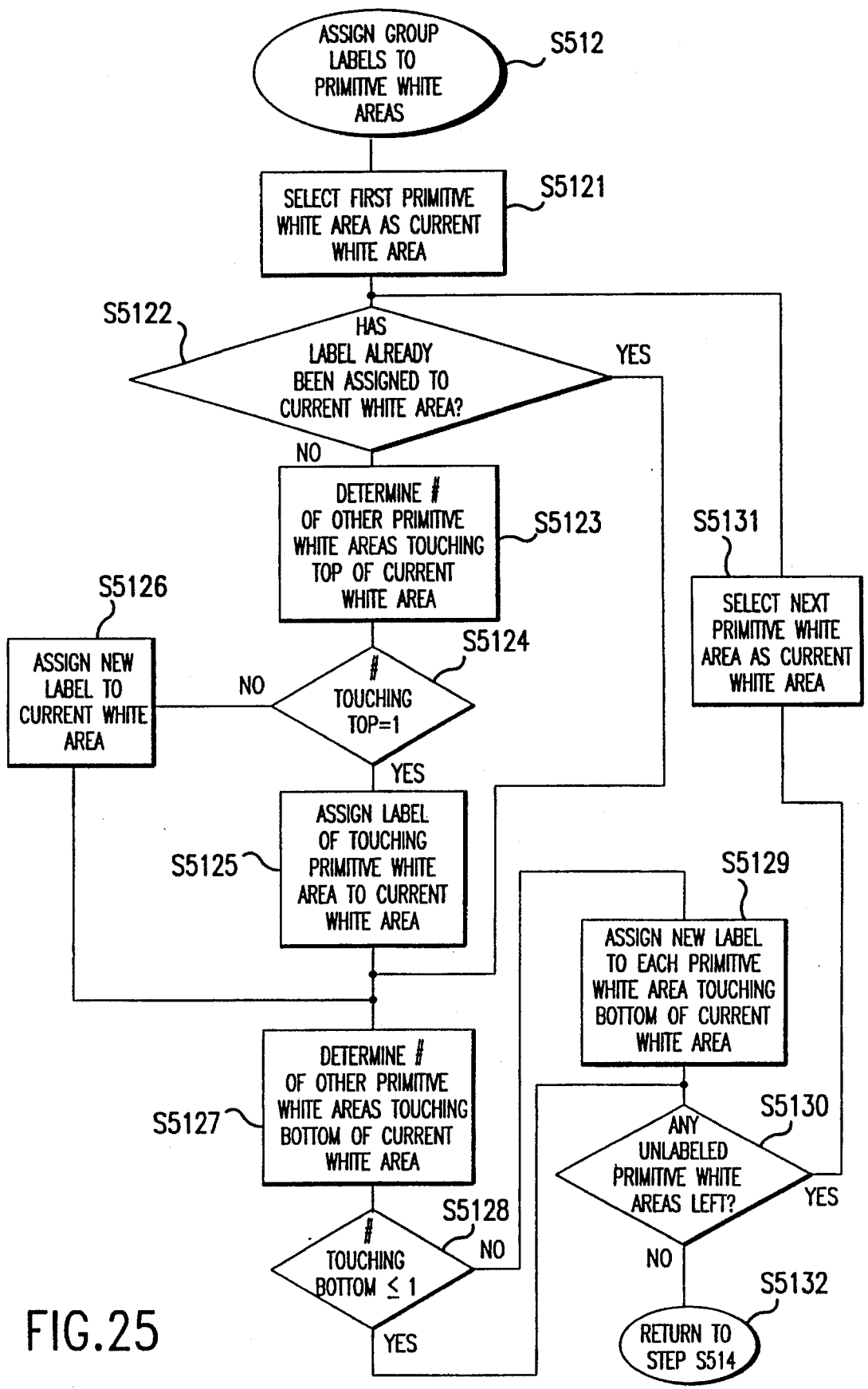
FIG. 25 is a flow chart of one embodiment of the method for assigning group labels to primitive white areas.

FIG. 25 outlines one preferred embodiment of the process of assigning labels to the primitive white areas 630 of step S512. In step S5121, the primitive white area 630-A of FIG. 19 located at the top of the document image is selected as the current white area. The primitive white area currently being examined is called the current primitive white area. In step S5122, the current primitive white area is checked to determine if a label has already been assigned to it. If so, control jumps to step S5127. If not, control continues to step S5123.

In step S5123, the number of other primitive white areas touching the top of the current primitive white area is determined. Of course, for the topmost primitive white area 630A, this will be zero. For other ones of the primitive white areas 630, there may be zero, one or more than one other primitive white area 630 touching it. Next, in step S5124, the number of other primitive white areas 630 touching the top of the current primitive white area determined in step S5123 is checked to see if it is exactly equal to one. If so, control continues to step S5125 where the label assigned to the single other primitive white areas 630 touching the top of the current primitive white area is assigned as well to the current primitive white area. Otherwise, if there are zero or more than one other primitive white areas touching the top of the current primitive white area, control jumps to step S5126, where a new label is assigned to the current primitive white area. This is, of course, the situation for the topmost primitive white area 630-A. Then, both steps S5125 and 5126 continue to step S5127.

In step S5127, the number of other primitive white areas 630 touching the bottom of the current primitive white area is determined. Then, in step S5128, the number touching the bottom of the current primitive white area is checked to determine if it is less than or equal to one. If so, control jumps to step S5130. If not, control continues to step S5129, where each one of the other primitive white areas 630 touching the bottom of the current primitive white area are assigned new and different labels.

Control then continues to S5130, where the document image is checked to determine if any of the primitive white areas 630 of the document 600 still need to be assigned labels. If so, control returns to step S5131, where the uppermost unassigned primitive white areas 630 is selected as the current primitive white area. Control then jumps from step S5131 back to S5122. Otherwise, if no unassigned primitive white areas 630 remain, control flows to step S5132. In step S5132, control is returned to step S514.

Figure 26:
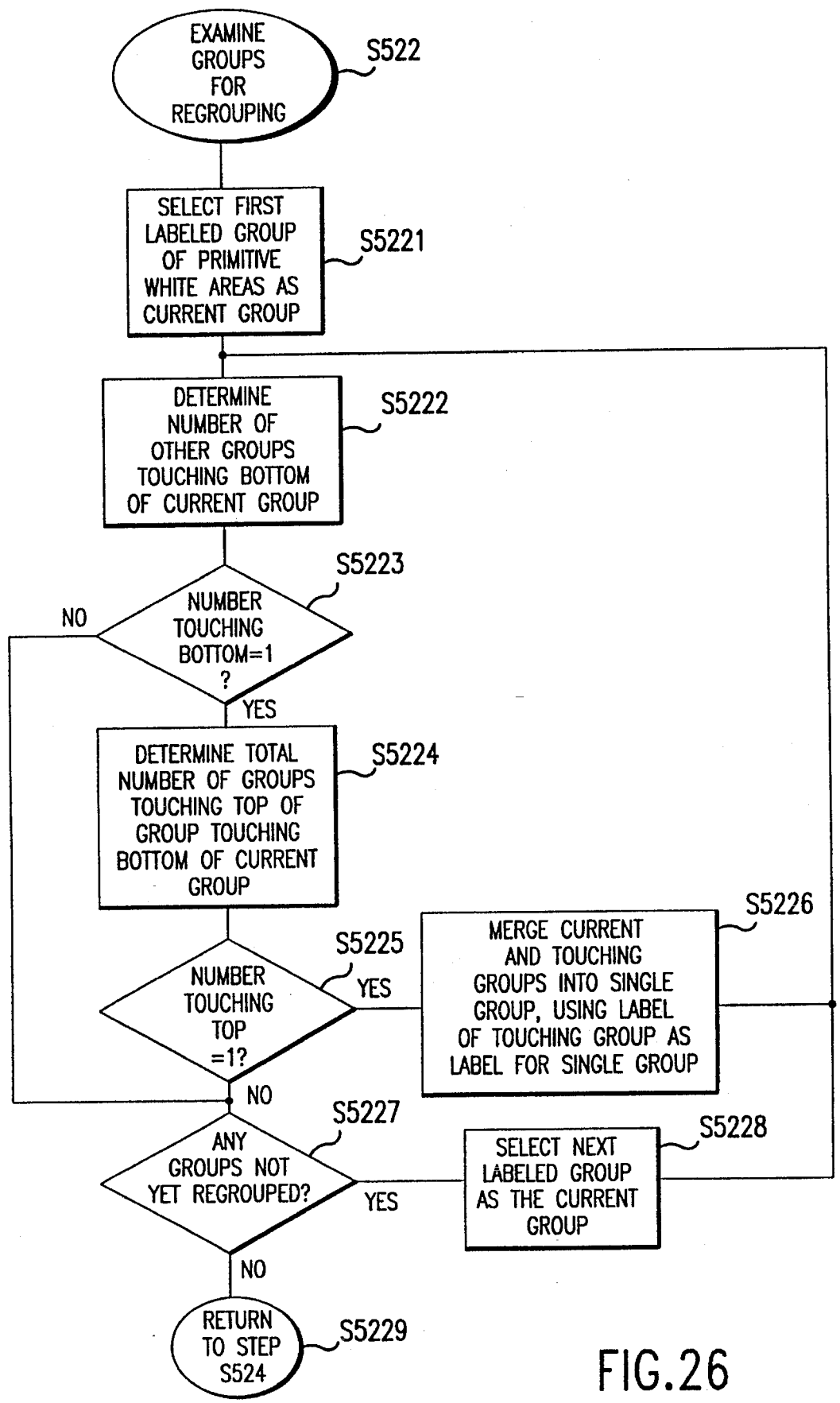
FIG. 26 is a flow chart of one embodiment of the method for examining remaining groups for regrouping.

FIG. 26 outlines one preferred embodiment for the method of grouping the primitive white area groups of step S522. In step S5221, the uppermost and leftmost unexamined white area group is selected as the current primitive white area group. In step S5222, the number of other primitive white area groups touching the bottom of the current primitive white area group is determined. In step S5223, if the number of other primitive white area groups touching the bottom of the current primitive white area group is not one, control jumps to step S5227. Otherwise, if the number is equal to one, control continues to step S5224. In step S5224, the total number of groups touching the top of the single groups touching the bottom of the current group is determined. Then, in step S5225, if the total number of touching groups is exactly equal to one, control continues to step S5226. Otherwise, control again jumps to step S5227. In step S5226, the label assigned to the single primitive white area group touching the bottom of the current primitive white area group is replaced with the label assigned to the current primitive white area group, thus merging the two groups. Control then returns to step S5222.

In step S5227, the document image 600 is checked to determine if any unexamined primitive white area groups remain in the document image 600. If so, control continues to step S5228, where the next group is selected as the current group. Then, control jumps back to step S5222. Otherwise, control jumps to step S5229, which returns control to step S524.

Figure 27A:
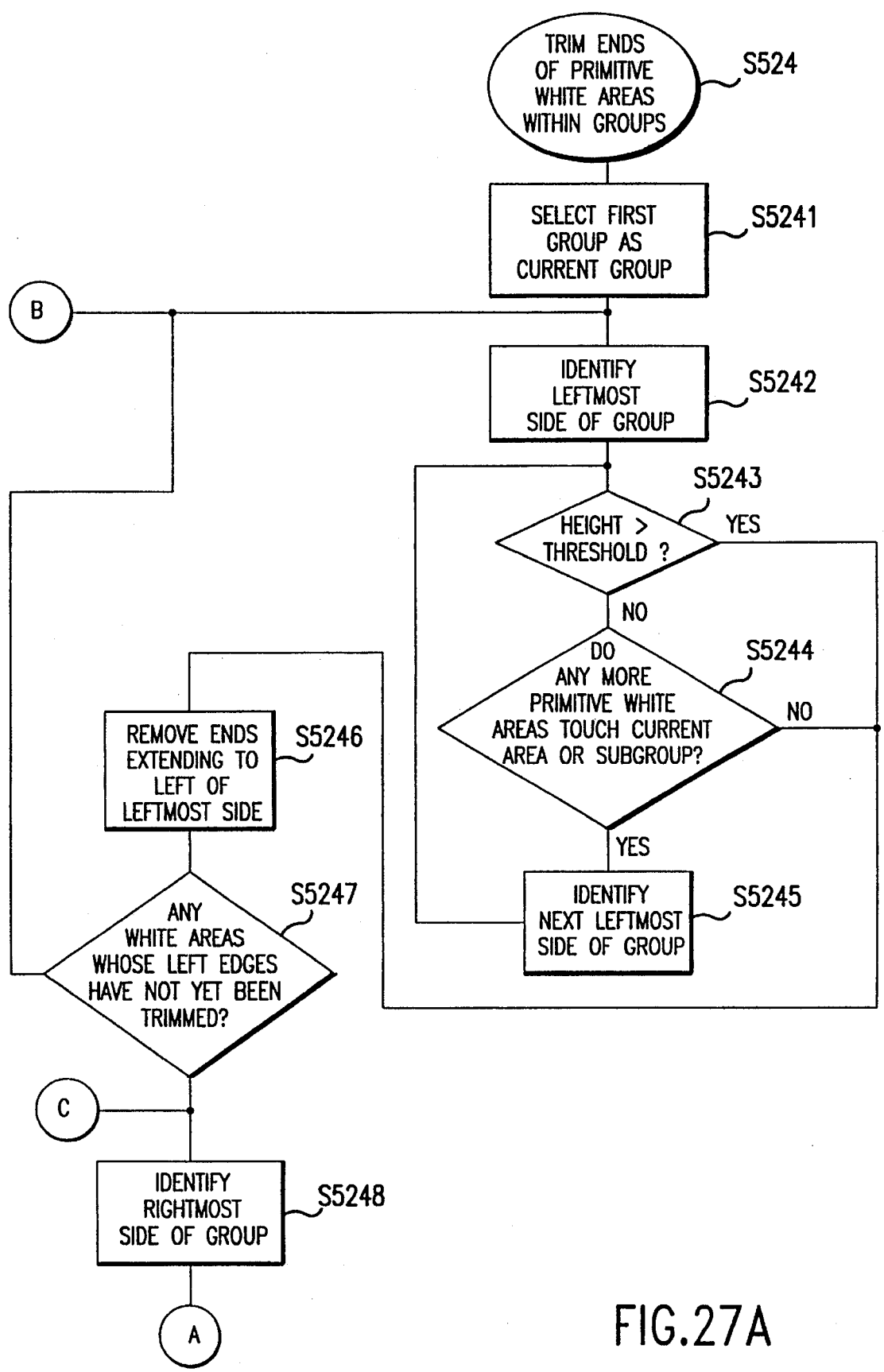
FIGS. 27A–B are a flow chart of one embodiment of the method for trimming ends of primitive white areas within groups.
Figure 27B:
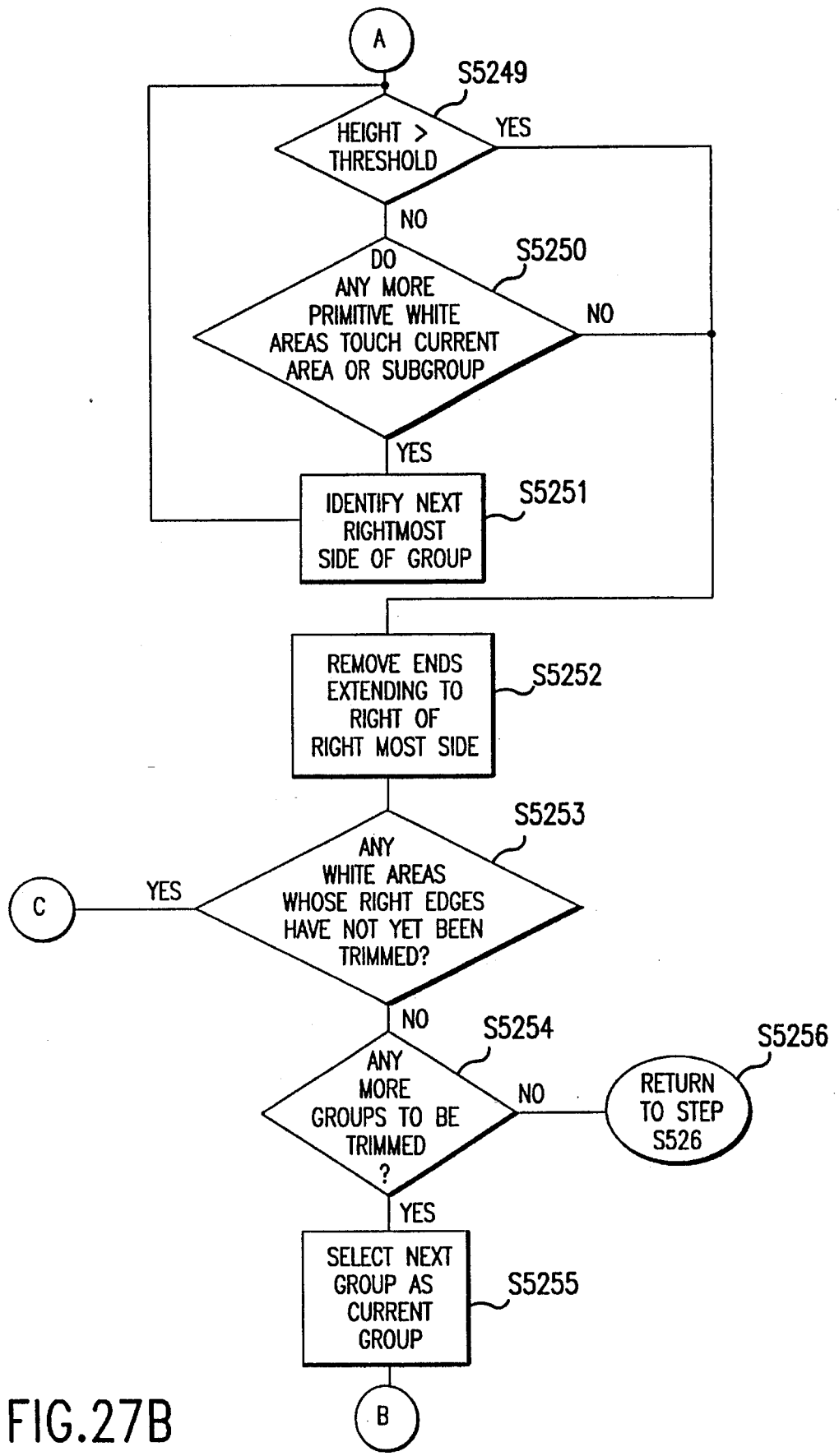

FIGS. 27A-B outline one preferred embodiment of the procedure for trimming the ends of the primitive white areas within a group of step S5241. First, in step S524, a first one of the primitive white area groups is selected as the current primitive white area group. Next, in step S5242, the leftmost side of the current primitive white area group is identified as the current leftmost side and the primitive white area of the current primitive white area group having the leftmost side is identified as the current area or current subgroup. Then, in step S5243, the height 47 of the current leftmost side of the current primitive white area or current subgroup of the current group of primitive white areas is compared against the height threshold 650 or 640'. If the height threshold 650 or 640' is not exceeded, control continues to step S5244, where the current group is checked to see if there are any remaining primitive white areas which touch the current area or subgroup.

If any touching primitive white areas remain, control continues to step S5245. Otherwise, if no touching primitive white areas remain, control jumps to step S5246. In step S5245, the next leftmost side of the current primitive white areas which touch the current area or subgroup is identified as the current leftmost side. This primitive white area is added to the current subgroup or the current area to form the current subgroup. Control then returns to step S5243. This loop remains in place until the height threshold 650 or 640' is exceeded by the height of the current area or subgroup or no more touching primitive white areas remain. Control then continues to step S5246.

In step S5246, the ends of the primitive white areas within the current primitive white area group which extend to the left of the current leftmost side of the current primitive white area or subgroup are removed. Control then continues to step S5247, which determines if there are any other primitive white areas of the current group whose left ends have not yet been trimmed and are not greater than the height threshold. If there are other areas whose left ends need trimming, control jumps back from step S5247 to step S5242.

If there are no other areas needing trimming, control continues to step S5248, which identifies the rightmost side of the primitive white area of the current primitive white area group as the current rightmost side. Control then continues to step S5249, where the height 47 of the current rightmost side is compared against the height threshold 650 or 640'. If the height threshold 650 or 640' is not exceeded, control continues to step S5250, where the current group is checked to see if there are any remaining primitive white areas which touch the current area or subgroup.

If any touching primitive white areas remain, control continues to step S5251. Otherwise, if no touching primitive white areas remain, control jumps to step S5252. In step S5251, the next rightmost side of the primitive white areas which touch the current white area or subgroup of the current primitive white area group is identified as the current rightmost side. Control then returns to step S5249. This loop continues until the height threshold is exceeded or no more touching primitive white areas remain. Then, control continues to step S5252, where the ends of the primitive white areas of the current primitive white area or subgroup which extend to the right of the current rightmost side are removed.

Control then continues to step S5253, which determines if there are any other primitive white areas of the current group whose right ends have not yet been trimmed and are not greater than the height threshold. If there are other areas whose right ends need trimming, control jumps back to step S5248. Otherwise, if there are no other areas needing trimming, control continues to step S5254, which determines if there are any untrimmed primitive white area groups remaining within the document image 600. If there are, control continues to step S5255, where a next primitive white area group is selected as the current primitive white area group. Control then returns to step S5242. Otherwise, if all of the primitive white area groups of the document image 600 have been trimmed, control continues to step S5256, which returns control to step S526.

FIGS. 28–30 graphically show the operation of the trimming process outlined in FIGS. 27A–B. As shown in FIG. 28, a group 48 comprises individual primitive white areas 631–637. Initially, primitive white area 635 and 636 define the left-most edge of the group 48. The vertical height 47 of the common left edge of the primitive white areas 635 and 636 is compared to the height threshold 650. As shown in FIG. 28, the height threshold 650, when measured from the bottom-most edge of the primitive white area 636, extends beyond the top edge of the primitive white area 634 but below the top edge of the primitive white area 633. Thus, primitive white areas 635 and 636 are grouped together as the current subgroup, and the primitive white areas touching this current subgroup are identified. In FIG. 28, this includes primitive white areas 634 and 637.

Accordingly, the left edge of the primitive white areas 635 and 636 is trimmed back to the left edge of the primitive white area 634, as shown in FIG. 29. The height of this new left edge is then compared to the height threshold 650. Since the height threshold 650 is still not exceeded, the left edge of the primitive white areas 634–636 is further trimmed back to the left edge of the primitive white area 633. Similarly, the left-edge of the primitive white area 631 is also trimmed back to the left edge of the primitive white area 632. The left edge of the current area or group is always adjusted or trimmed to the next leftmost of the primitive white areas which touch the current area or group.

In FIGS. 28–30, the primitive white area 632 touches the primitive white area 631, but the other primitive white areas 633–637 do not. While the height 47 of the primitive white area 631 does not figure into the comparison against the height threshold 650, it is also trimmed back so that the leftmost point of the group 48 does not extend any further left than the leftmost edge of the trimmed subgroup of primitive white regions which do exceed the height threshold 650. Since, as shown in FIG. 30, the leftmost edge of the group 48 defined by the primitive white areas 633–636 exceeds the height threshold 650, the trimming process for the leftmost edge of the group 48 is finished.

This process is then repeated for the right most edge of the group 48. In this case, the rightmost edge of the group 48, defined by the rightmost edge of the primitive white area 636 and 637 would first be trimmed back to be collinear with the rightmost edges of the primitive white areas 631 and 632. Since these primitive white areas are not adjacent, and neither alone exceeds the height threshold 650', the rightmost edges of the primitive white areas 631,632, 636, and 637 is further trimmed back to the rightmost edge of the primitive white areas 633 and 634. Since the rightmost edge defined by the primitive white areas 631–634 now exceeds the height threshold 47, the trimming process is complete.

Figure 31:
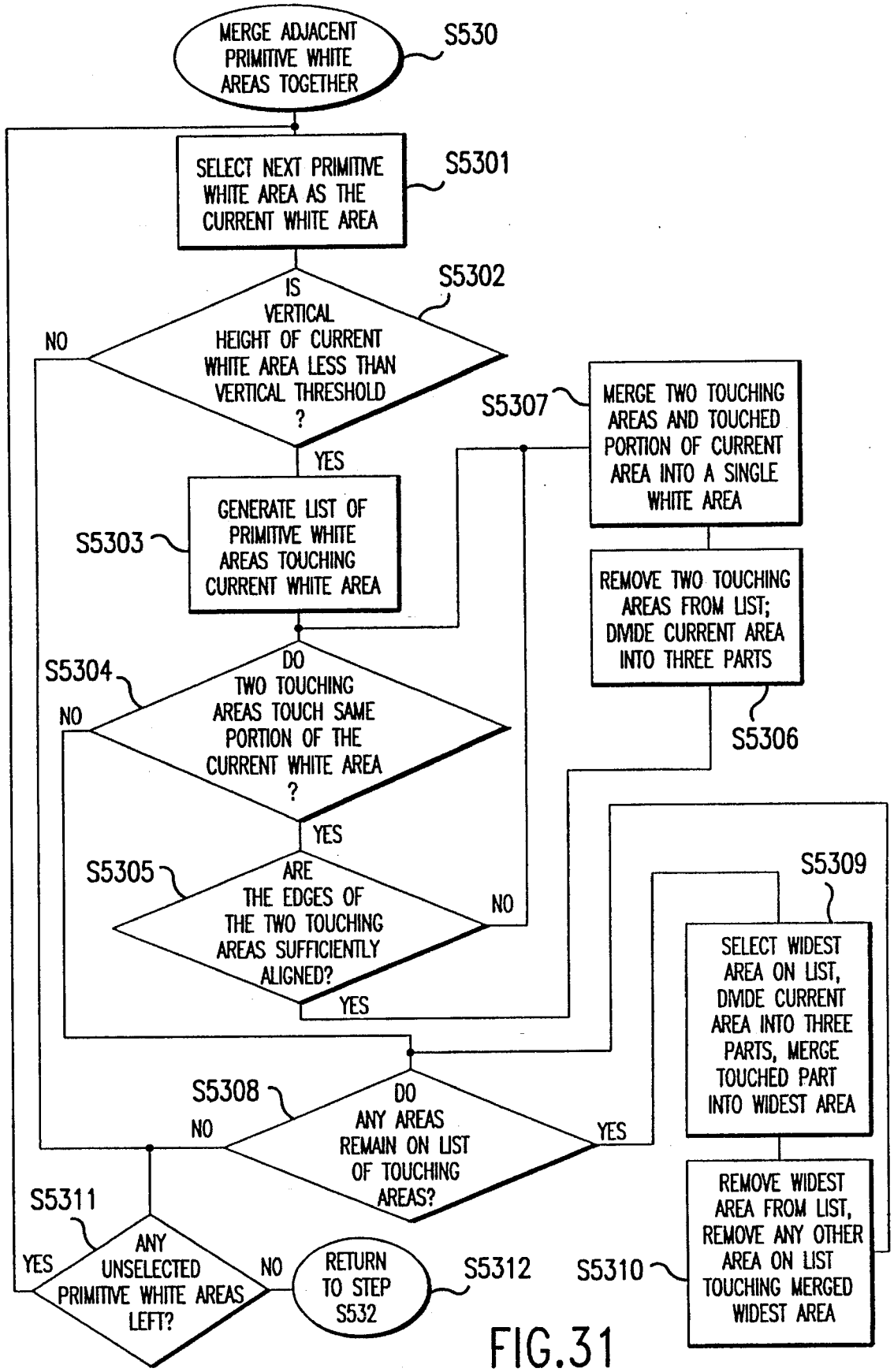
FIG. 31 is a flow chart of one embodiment of the method for merging adjacent primitive white areas into a single primitive white area.

FIG. 31 outlines one preferred embodiment of the process for merging two or more primitive white areas 630 into a single primitive white area 630 of step S530. In step S5301, a first primitive white area 630 is selected as the current primitive white area. In step S5302, the current white area is checked against the vertical threshold to determine if its vertical height is less than or more than the vertical threshold. If the vertical height of the current area is more than the vertical threshold, control jumps from step S5302 to S5311. Otherwise, if the vertical height of the current white area is less than the vertical threshold, control continues to step S5303.

Figure 32:
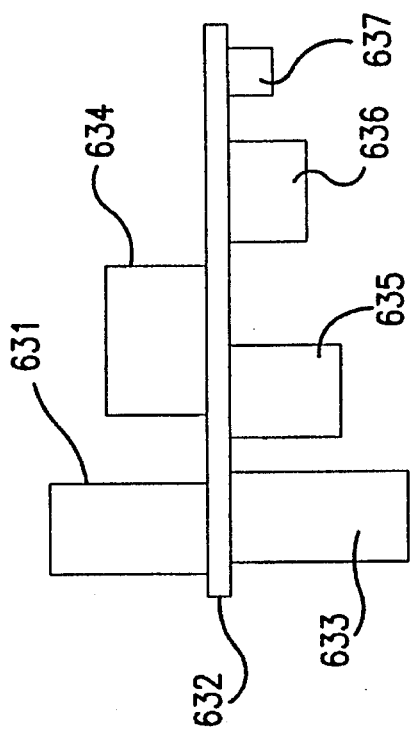

In step S5303, a list of other primitive white areas which touch the current primitive white area is generated. Then, in step 5304, the list of touching area is checked to determine if two of the touching area touch the same portion of the current white area. For example, as shown in FIG. 32, the touching primitive areas 631 and 633 touch the same portion of the current white area 632. Likewise, the touching primitive white areas 634 and 635 also touch the same portion of the current white area 632. If there are no pairs of touching areas on the list which touch the same portion of the current white area, control jumps to step S5308. Otherwise, if there are two touching area which touch the same portion of the current white area, control continues to step S5305.

In step S5305, the edges of the pair of touching areas are checked to determine if they sufficiently align. For example, as shown in FIG. 32, the edges of the touching white areas 631 and 633 are sufficiently aligned, while the edges of the touching areas 634 and 635 are not sufficiently aligned. In each pass through step S5304, one pair of two touching area is selected and in step S5305 the selected pair is checked. If, in step S5305, the edges are not sufficiently aligned, control jumps back to step S5304 which checks another one of the pairs of touching areas. This loop, through step S5305 and back to step S5304, will continue until each touching pair is checked.

Figure 33:
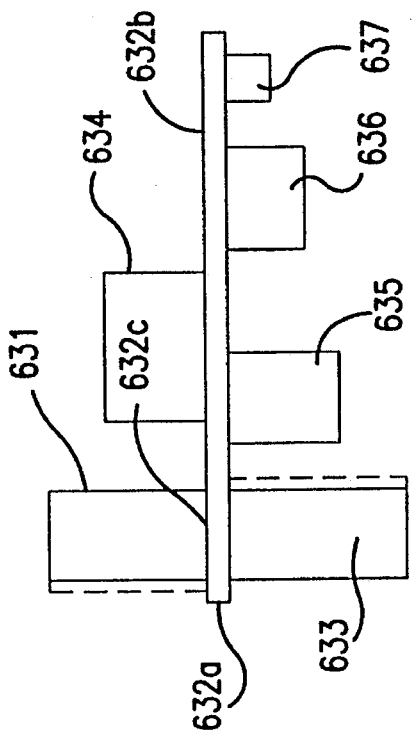
FIGS. 32–35 graphically illustrate how primitive white areas are merged with other adjacent primitive white areas.
Figure 34:
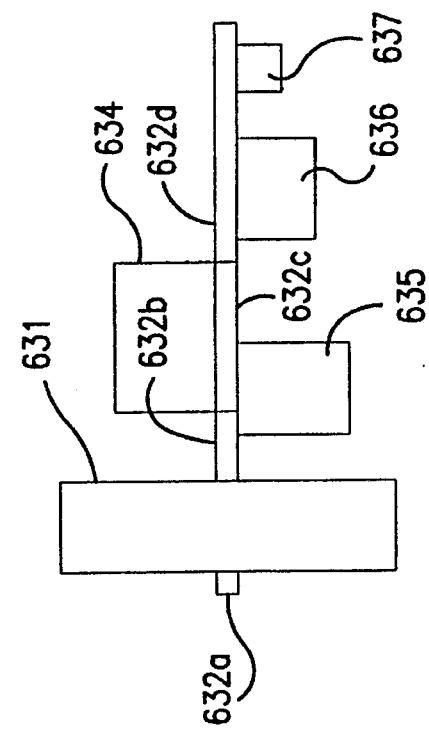

If, in step S5305, the edges of the pair of touching areas are sufficiently aligned, control continues to step S5306, where the pair of touching areas are removed from the list of touching areas and the current white area is divided into three parts, as shown in FIG. 33. Of course, if both left edges of the pair of touching areas, or both right edges, are aligned, respectively, with the left edge or the right edge of the current white area, the current white area will only be divided into two portions. Then, in S5307, the two touching areas and the touched portion of the current white area are merged into a single white area. This process is shown in FIGS. 33 and 34, where the touching white areas 632 and 633 and the touched portion 632c of the current white area 632 are merged into a single white area 631. Then, control returns to step S5304 to check another one of the pairs of touching areas.

Once all the pairs of touching areas have been analyzed in the loop of steps S5304–5307, control jumps from step S5304 to step S5308. In step S5308, the list of touching areas is checked to determine if any areas remain on the list. If no touching areas remain on the list, control jumps from step S5308 to step S5311. Otherwise, if areas do remain on the list of touching areas, control continues to step S5309.

Figure 35:
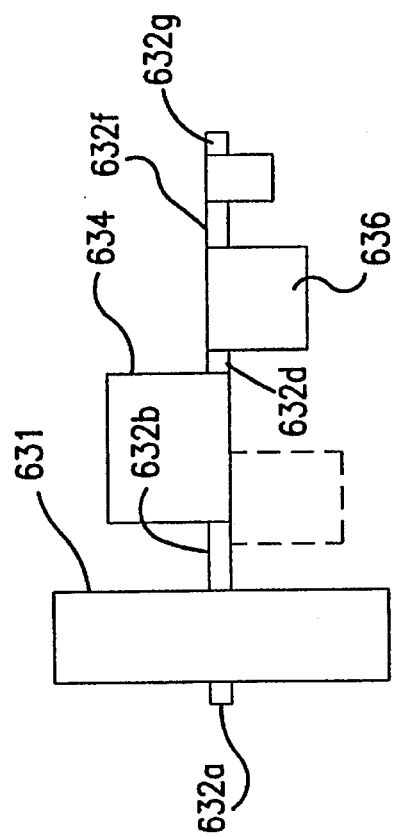

In step S5309, the widest touching area which remains on the list of touching areas is selected, and the part of the current white area which is touched by the selected widest area is further divided into three portions. As shown in FIGS. 33 and 34, the widest remaining portion 634 touches portion 632b of the current white area 632. Accordingly, the portion 632b is further divided into an untouched portion 632d and a touched portion 632e. As shown in FIG. 35, the touched portion 632e is merged into the widest area 634.

Then, in step S5310, the selected widest area is removed from the list and any other area on the list which touches the same portion of the current primitive white area as the selected widest area is also removed from the list from touching areas. Then, control jumps back from step S5310 to step S5308, to again determine if any areas remain on the list of touching areas. Once all the touching areas remaining on the list have been selected, and the portions of the current white area they touch merged into them, control jumps from step S5308 to S5311, which determines if any unselected primitive white areas are left in the document image. If so, control jumps back from step S5311 to step S5301, where the next primitive white area is again selected as a current white area. Otherwise, if all of the primitive white areas of the document image have been selected and compared against the vertical threshold, control continues to step S5312, which returns control to step S5302.

As shown in FIG. 32, a current white area 632 is touched by six other primitive white areas 631 and 633–637. The primitive white areas 631 and 634 would have been previously compared against the vertical threshold, and if they are less than it, would have been previously analyzed. In this case, neither one of the touching primitive areas 631 or 634 is less then the vertical threshold. Once the list of touching white areas is generated, as described above, those touching primitive white areas which touch a common portion of the current primitive white area 632 and have edges which are sufficiently aligned are merged into a single white area. Thus, as shown in FIG. 33, the touching primitive white areas 631 and 633 are merged together, along with the commonly touched portion 632c of the current portion 632. In addition, the edges of the touching primitive area 631 and 633 are trimmed back to be aligned with the edges of the commonly touched portion 632c. Because the edges of the other touching white areas 634 and 635, which also touch a common portion of the current primitive white area are not sufficiently aligned, they are not merged together.

Then, as shown in FIG. 34, the widest remaining touching area on the list of touching areas is selected and the touched portion 632e of the current white portion 632 is merged into the selected widest remaining touching white area 634. At the same time, any other touching area on the list of touching areas which also touches the touched area 632e is removed from the list of touching areas. This process of locating the widest remaining touching area continues until no touching primitive white areas remain in the list of primitive white areas. Thus, as shown in FIG. 35, the touched portions of the current area 632 are merged into the touching white areas 636 and 637 and the current white area is further divided into untouched portions 632d, 632f and 632g.

The document white region extraction system 110 described is only one of many possible embodiments for implementing the document white region extraction method explained above. Therefore, the document white region extraction system 110 set forth is exemplary only and should not be construed to limit the various types and configurations of systems which can be used to implement the document element segmentation method.

Figure 36:
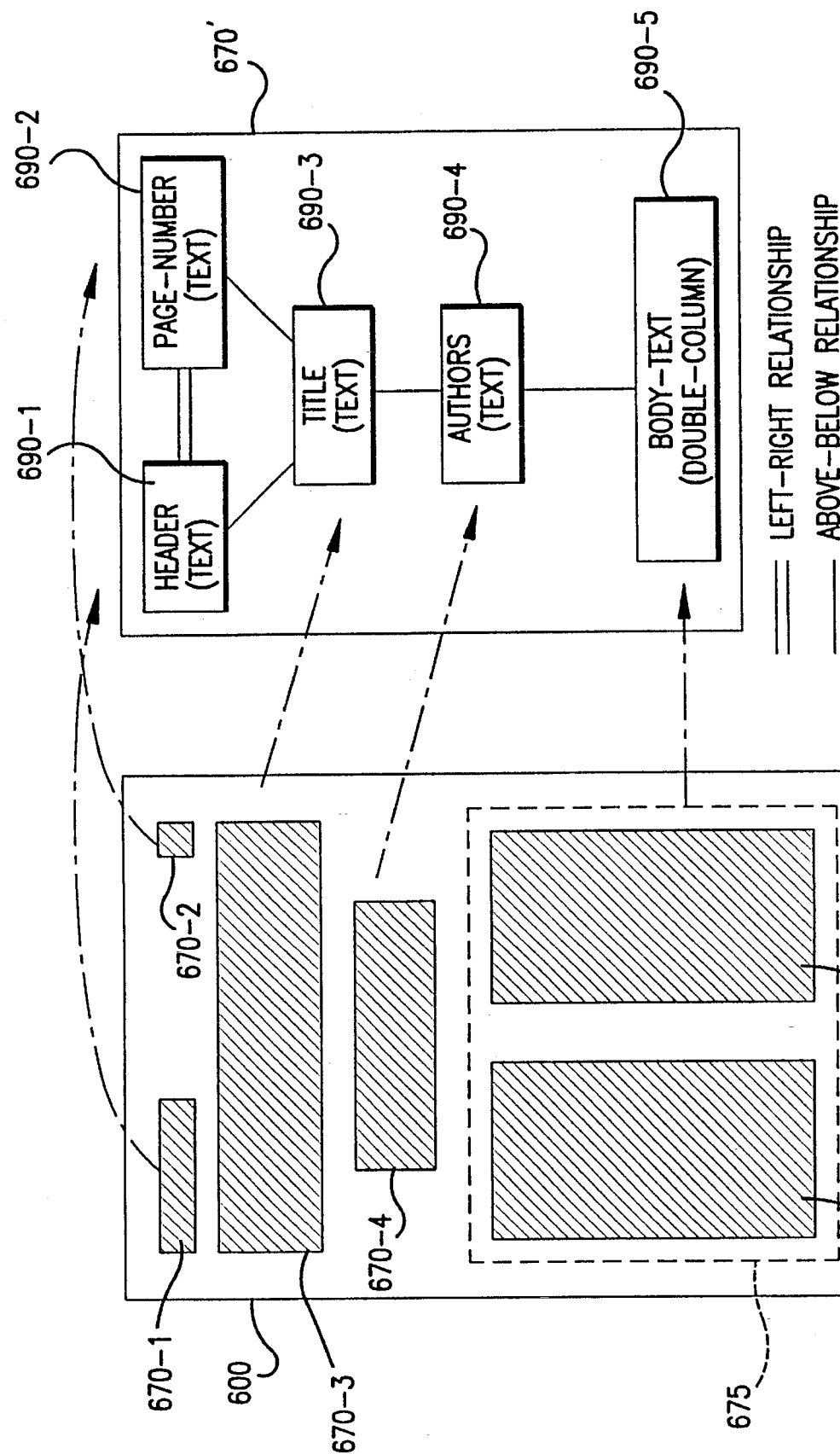
FIG. 36 shows a document image and the corresponding document elements and logical tags.

As shown in FIG. 36, the document image 600 may contain any number of document elements 670. The document elements 670 of a document image 600 are logically identified by comparing the spatial or geometric relationships between the major white regions 660 in the document image 600 to the relationships between the major white regions 660 existing between the document elements 670 in each of a plurality of structural models. If the geometric relationships between the major white areas of the document image 600 match the relationships in a structural model, the document image 600 belongs to the type of the matching structural model. The document elements 670 in the document image 600 can be extracted by the major white regions. The extracted document elements are thus assigned the same logical tags 690 as the corresponding element definitions in the structural model. The logical tags 690 are names for the document elements 670, such as "Title", "Author", etc. Assigning the logical tags 690 to the document elements 670 logically identifies the document elements 670.

However, before the document elements 670 of the document image 600 can be logically identified, the document element identification system 100 must be provided with a set of structural models. Each structural model comprises the corresponding document elements and the spatial or geometrical relationships between the document elements of a corresponding model document.

A structural model has four basic parts, comprising a name for the model document, a type of the structural model, a subordinate element description section, and a geometric relationship description section. The name of the model document is chosen by a user. The type of structural model can either be "document" or "composite-element". If a structural model is defined as a "composite-element" type, it is usable as a subordinate element in another structural model. As shown in FIG. 36, the two document elements 670-5 and 670-6, which represent the double-column text in the document image 600, may be identified as a composite-element type document element 675 in the structural model for the document image of FIG. 37. The composite-element document element 675 is then further defined using a second structural model. Finally, the geometric description section contains geometric relationships which describe the spatial relationships between the document elements 670 of the model document of the structural model, including the major and the minor relationships, the gap spacings between document elements 670 and the logical tags 690 for the document elements 670.

Each pair of adjacent document elements 670 in a document image 600 has one major relationship describing the geometrical relation between them. This major relationship can be either an "above-below" relationship or a "left-right" relationship. As shown in FIG. 36, the document element 670-1 has a left-right relationship with the document element 670-2. This is reflected in the corresponding model document, in which the Header logical tag 690-1 has a left-right relationship with the Page Number logical tag 690-2. The document elements 670-1 and 670-2 also each have an above-below relationship with the document element 670-3. Similarly, in the corresponding model document, the Header logical tag 690-1 and the Page Number logical tag 690-2 each have an above-below relationship with the Title logical tag 690-3.

Figure 43:
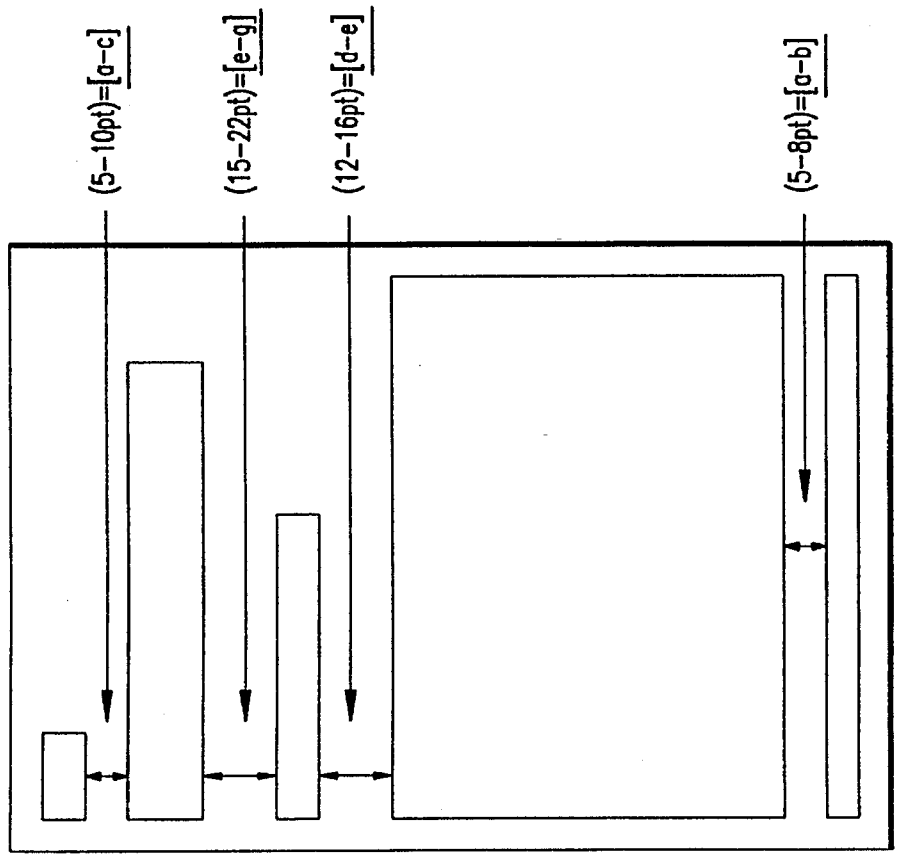
FIG. 43 graphically illustrates one preferred embodiment of the gap spacings between document elements.

The major relationships are also accompanied by a gap width, which indicates the possible range of spacing between adjacent document elements 670. For example, a geometric relationship could indicate a separation or major white region whose size is from 12 to 18 points exists between the Header logical tag 690-1 and the Title logical tag 690-3. The gap width is equal to the width of the major white region 660 separating the two adjacent document elements 670, as shown in FIG. 43. These gap widths can be obtained from observation of some of the actual sample images or model documents which should be handled by the same structural model.

The minor relationships defined between the logical tags 690 include left-aligned, right-aligned, centered, indented, and the like. The logical tags 690 correspond to the document elements 670 in the document image 600. Thus, the logical tags 690 are equivalent to the names given to the document elements 670 by a user, such as Title, Header, Author, and the like.

FIG. 37 shows a structural model for a model document named "Cover Page-of-Report". The type of structural model, as well as the names and types of the document elements 670 in the model document 600 of this structural model, are shown in FIG. 37. In the "Relationships" section, the geometric relationships between adjacent pairs of the model document's document elements 670 are described using the document elements 670 corresponding logical tags 690, the major relationships between adjacent ones of the document elements 670, the minimum and maximum spacing between the adjacent document elements 670 (i.e., the gap width), and any other relevant minor relationships. If the document elements are treated as nodes and spacial relationships between the document elements are treated as links between the nodes, the document elements and relationships of a structural model form a graph data structure.

In a preferred embodiment of this invention, the structural models are predefined and prestored into a model storage section of the memory 410 before the document element tagging process is begun for an untagged or unanalyzed document 601. Preferably, the structural models to be used have been manually created by a user by observation of model documents which best represent the type of document represented by each structural model. Preferably, a number of such model documents are used for each structural model, so a range of acceptable sizes for each major white region can be determined.

Alternately, the structural model definition support means 450 can be used to interactively aid a user in defining a structural model. The structural model definition support means 450 aids the user by prompting the user to designate the document elements of a model document, to determine the size of the white spaces between the designated document elements, and to provide logical tags for each of the designated document elements. Thus, the user defines a structural model by typing in the text of the structural description, as shown in FIG. 37. If the user does not have accurate information for the white space widths, the structural model definition support means 450 helps. The user provides a model document to the scanner 200. The scanned document is then displayed to the user via the user interface 510. The structural model definition support means 450 prompts the user via the user interface 510 to designate areas corresponding to the element definitions one by one. The designation is done by a pointing device of the user interface 510, such as a mouse. The structural model definition support means 450 shows a logical tag of an element definition in the structural model to the user, and the user designates a rectangle surrounding the document element area of the scanned model document using the pointing device. The structural model definition support means 450 minimizes the rectangle to make it a bounding box of all of the black pixels in the designated area. After designating rectangles for all of the element definitions in the structural model, the structural model definition support means 450 measures the distances between the designated rectangles for each of the major geometric relationships, which is either "above-below" or "left-right", and updates the structural model description being currently edited based on the measured sizes of the major white regions. The user can repeat this process on a number of model document images which are to be associated with the same structural model in order to obtain accurate size range data for the gap widths.

Once each structural model is defined, either completely by hand or with the aid of the structural model definition means 450, and is stored to the model storage section of the memory 410, a regular expression for each level of each stored structure model is generated using the model translating means 470. In the model translating means 470, a translation of each structural model into a nested model is performed. First, those element definitions which connect to an identical element by the same major relationship and also connect to each other by the orthogonal relationship are grouped into one pseudo-element. This process of forming pseudo-elements continues until only a single one-dimensional graph of elements and pseudo-elements remains. Thus, the top level of the graph comprises pseudo-elements and elements linked together by one type of relationship, and each pseudo-element or composite-type element comprises elements and/or pseudo-elements linked together by the orthogonal type of relationship than the type of relationship used in the level to which the pseudo-element or composite-type element belongs. Because each pseudo-element or composite-type element can itself comprise pseudo-elements or composite-type elements, the number of the nesting levels can be any integer. For the geometric relationship connecting a pseudo-element, the minimum gap width is set to the largest value of the minimum gap lengths of the merged geometric relationship. Similarly, the maximum gap width is set to the smallest value of the maximum gap lengths of the merged geometric of the elements comprising the pseudo-element relationships.

Figure 39:
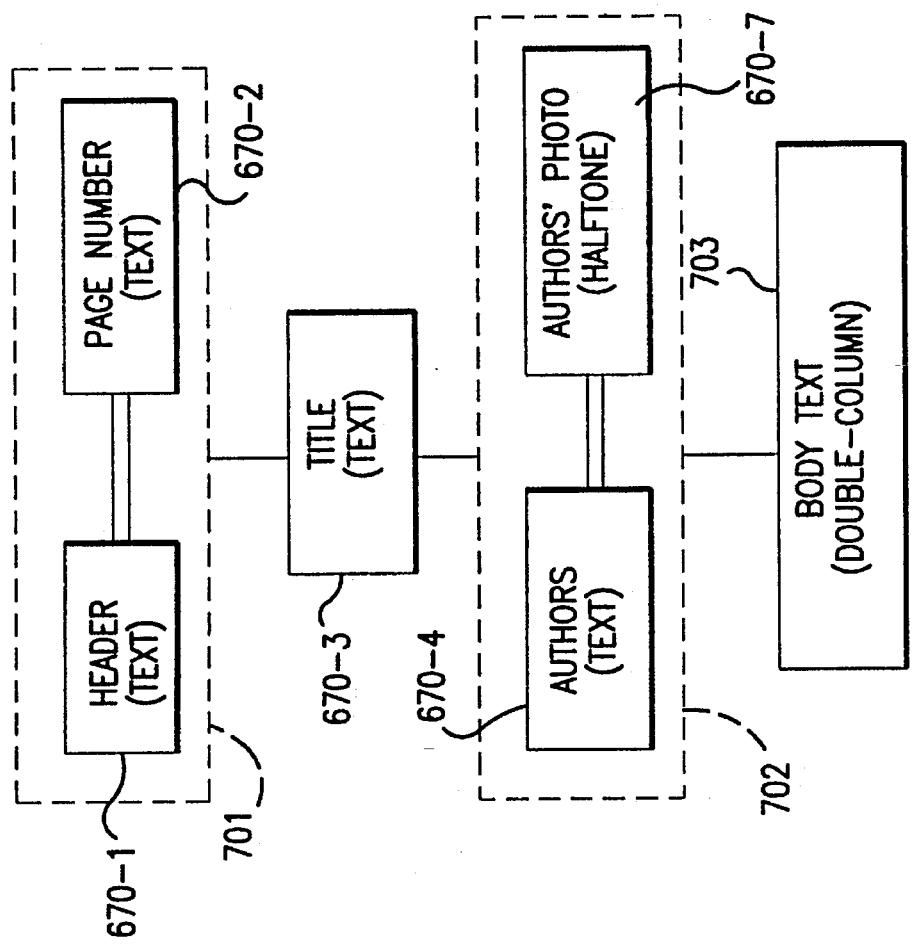
FIG. 39 shows the set of document elements of FIG. 38 grouped into pseudo-elements and the corresponding major relationships.

Thus, the two-dimensional graph of each structural model is translated by the model translating means 470 into a nested, one-dimensional hierarchical graph. FIG. 45 shows an example of a top-level expression pattern which describes the separations between the document elements 670 in the model document 600. This top-level expression pattern describes only the vertical spacing between document elements 670. One second-level expression pattern is developed to describe the spacing between the document elements 670 within each pseudo-element 700. As shown in FIG. 39, the pseudo-elements 701, 702 and 703 are each formed from two or more document elements 670 which are connected to the same third document element 670 by the same major geometric relationship and are connected to each other by the orthogonal major relationship. Minor relationships between document elements are not translated, but are used in the final stage of the matching process.

For each level of the nested model, all of the element definitions are connected by a single major relationship, either the "above-below" relationship or the "left-right" relationship and each of these relationship links has a range for the white space size between the elements associated with it. By using this information, each level of the structural model is further translated into a regular expression. A regular expression represents a string pattern commonly used in the computer software art. Each white space is translated into a pattern '[c1–c2]' where c1 is a character code corresponding to a minimum value for the range of white space associated with the major spacial relationship and c2 is a character code corresponding to the maximum value of the range of white space. These characters can be obtained by the following equation.

$$c = \text{round}(v/d) + a$$

where "round" is a function for rounding a value to an integer, c is a corresponding character, "v" is a minimum or maximum value in the definition, "d" is a constant and "a" is the minimum character code which can be used in the system. Thus, as v increases, the corresponding character code also increases. For example, if d is set to 3, C1 is defined as 'e' when v =12(pt). Thus, a white space ranging from 12 to 18 points is translated into the string pattern '[e–g]'. This string pattern is created for each geometric relationship and concatenated from top to bottom in the case of "above-below" relation or from left to right in the case of "left-right". Thus, a pattern for the string of white spaces associated with each relationship in the top-level of the nested model may look like '[e–g][f–g]. . . '. However, there is the possibility that an arbitrary number of white spaces may occur within an element. These arbitrary white spaces are smaller than the white space separating the document element containing them from the adjacent document elements. In order to handle this case, repetitive patterns are inserted between every two white space string pattern elements. Once all of the string patterns for the extracted major white regions are determined, the regular expression looks like '[a–e]*[e–g][a–e]*[f–g]. . . '. where [c1–c2]* defines and is able to match an arbitrary number of smaller white spaces between element separating the major white regions.

Figure 44:
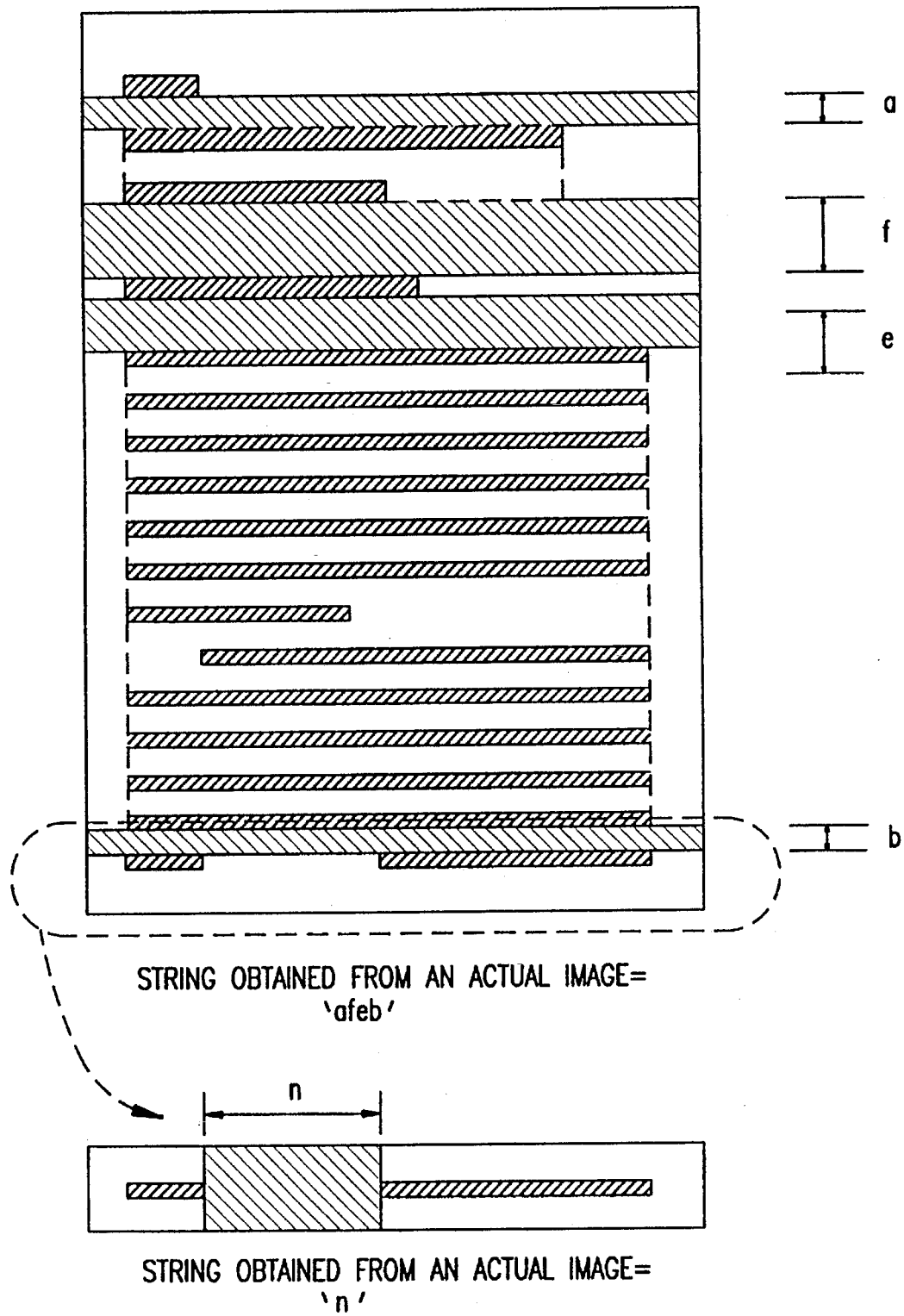
FIG. 44 is a sample document to be compared to a plurality of structural models.

With a set of one or more structural models stored in a memory, the unidentified document elements 670 of an unanalyzed document image 601 are identified. The unanalyzed document image 601, having unidentified document elements 670 to be logically identified, is input through either the scanner 200 or the remote interface 520. The major white regions 660 are extracted from the unanalyzed document image 601 by the document white region extraction system 110. The major white regions 660 are sent to the white area selecting means 480. The white area selecting means 480 selects the white areas which will be used for the regular expression matching. For example, if all top-level regular expressions are created from "above-below" relations, only the horizontal major white spaces lying between the vertical edges of the input image 601 are selected. Thus, the corresponding top-level character string shows the vertical spacing between the document elements 670. FIG. 44 shows that the top-level character string for the unanalyzed document image 601 is "afeb". Each letter of the character string designates the actual vertical gap spacing between the document elements 670. The second-level character strings shows the horizontal spacing between the document elements 670 within the corresponding pseudo-elements 700. In the unanalyzed document image 601 of FIG. 44, the second-level character string corresponding to the single pseudo-element is "n". If the second level document elements also included a pseudo-element, then a third level string would describe the vertical spacing between the document elements of this second level pseudo-element.

Upon receiving the character strings from the white area selecting means 480 defining the relative locations between the document elements 670 and the separations between document elements 670, the regular expression matching means 490 compares the top-level character string of the unanalyzed document image 601 shown in FIG. 44 with each of the top-level expression patterns in the plurality of structural models stored in the memory 410. The document image described by one such stored structural model is shown in FIG. 45. The comparisons are fairly straightforward. Either the top-level character string from the unanalyzed document image 601 falls within the ranges of a structural model's expression pattern or it does not. The matching structural models are identified, and this process is repeated for each level in the unanalyzed document image 601. Then, after all of the levels of the unanalyzed document 601 are analyzed, for each remaining matching structural model, the minor relationships are compared to find a final matching structural model. This final structural model is then output to the logical tag assigning means 500.

If, after comparing the minor relationships, more than one structural model remains in the final set of structural models output to the logical tag assigning means 500, the logical tag assigning means 500 will prompt a user through the user interface 510. The user is then required to indicate which structural model in the final set is the correct structural model for the unanalyzed document image 601. Once the final structural model is identified, the logical tag assigning means 500 assigns a logical tag 690 to each document element 670 of the unanalyzed document image 601 based on the logical tags 690 of the final structural model. In one preferred embodiment of the invention, if, at any point in this process, the set of most similar structural models is empty, i.e., that the unanalyzed document image 601 does not match any of the stored structural models, the structural model definition support means 470 prompts the user to use the unanalyzed document image 601 as a new model document to generate a new structural model.

The document elements 670 of the unanalyzed document image 601, along with the corresponding logical tags 690, may be stored in the memory 410 or output to the processor 460 for further processing. Such further processing can include optical character recognition processing on specific document elements 670 based on their corresponding logical tags 690, or outputting various ones of the document elements 670 to the printer 300, to print, for example, the title of the document along with a list of the authors.

Figure 46:
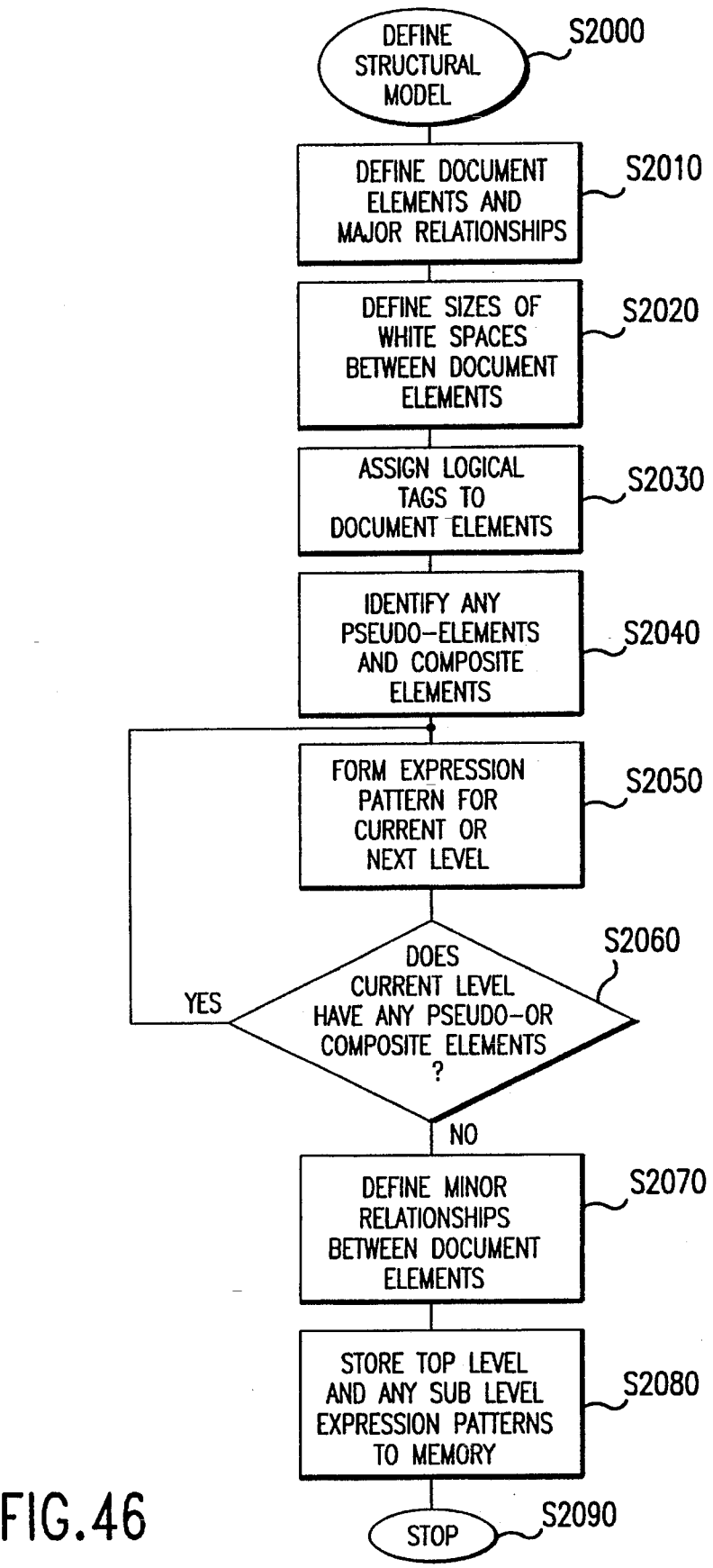
FIG. 46 is a flowchart of one preferred embodiment of the method for generating structural models.
Figure 47:
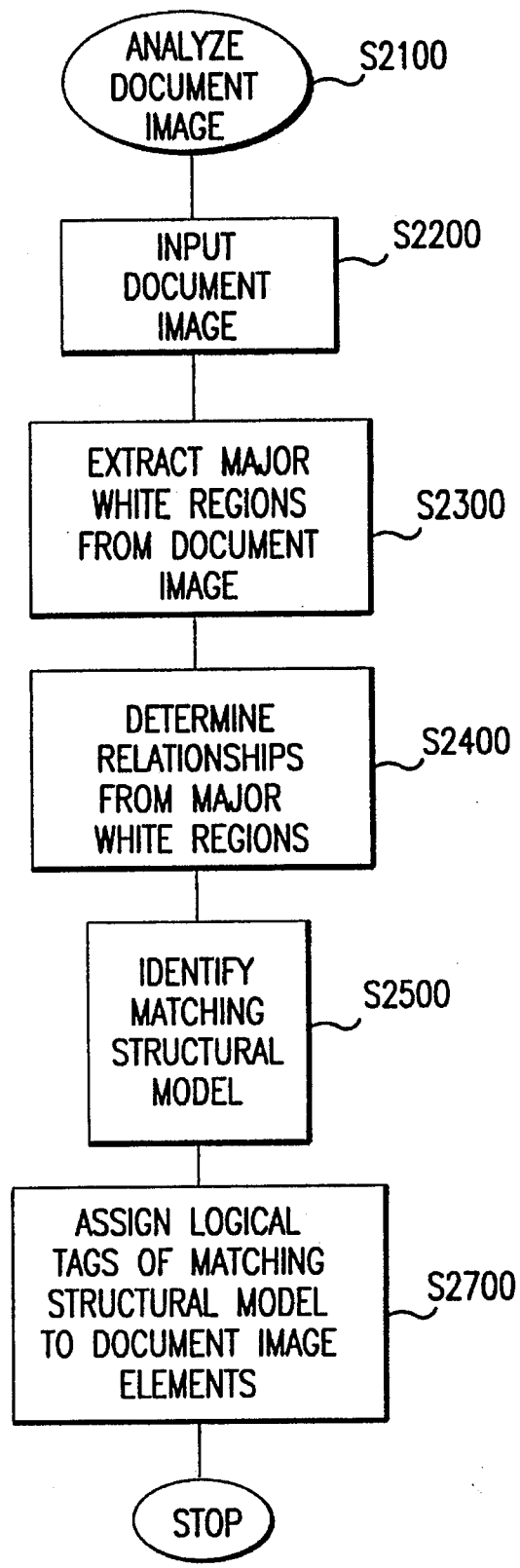
FIG. 47 is a flowchart of one preferred embodiment of the method for analyzing a document image to assign logical tags to the document elements.

One preferred embodiment of the method for identifying document elements 670 using the stored structural models is shown in FIGS. 46–48, initially, a plurality of structural models are described by users and stored in the memory 410.

In the first preferred embodiment of the invention as described above, the defined structural models are translated into nested, hierarchical, one-dimensional relationships by the model translation means 480. Thus, starting in step S2000, in step S2010 the document elements are identified and in step S2020, the sizes of the white areas between the document elements are defined. Then, in step S2030, the logical tags 690 are assigned to the document elements 670 described in step S2010. In the preferred embodiment, the user is prompted via the interface 510 and requested to input the logical tags 690 for each of the document elements 670. It should be appreciated that this is but one way to assist the user to describe the structural model.

Figure 38:
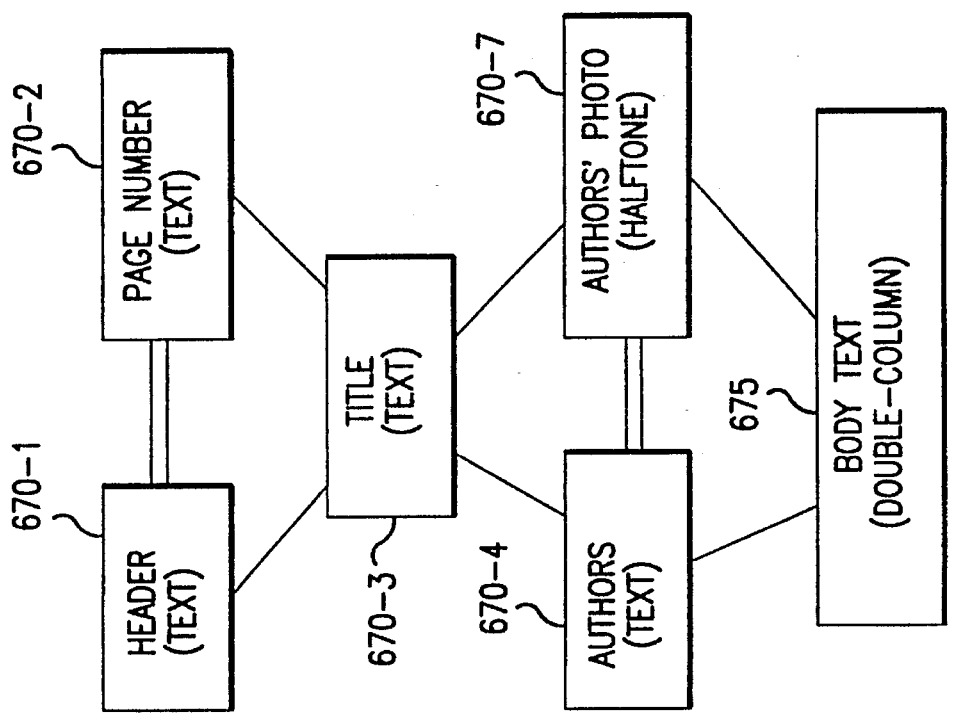
FIG. 38 shows a exemplary set of document elements and the major relationships between the document elements.

Next, in step S2040, any pseudo-elements 700 are identified and established, as shown in FIGS. 38 and 39. The pseudo-elements 700 are formed from the document elements 670 which connect to the same other document element 670 by the same major geometric relationship and which connect to each other by the orthogonal major relationship. As shown in FIGS. 38 and 39, the document elements 670-1 and 670-2 form a pseudo-element 701. The pseudo-element 701 is formed because both the document elements 670-1 and 670-2 each connect to the document element 670-3 by an above below relationship and connect to each other by the orthogonal left-right major relationship. Likewise, the document elements 670-4 and 670-7 are grouped together to form the pseudo-element 702. The pseudo-element 702 is formed because both the document elements 670-4 and 670-7 each connect to the document elements 670-3 and the pseudo-element 703 by above below relationships and connected to each other by the orthogonal left-right major relationship. The pseudo-element 703 was previously formed from the composite-type text column document element 675.

Figure 42:
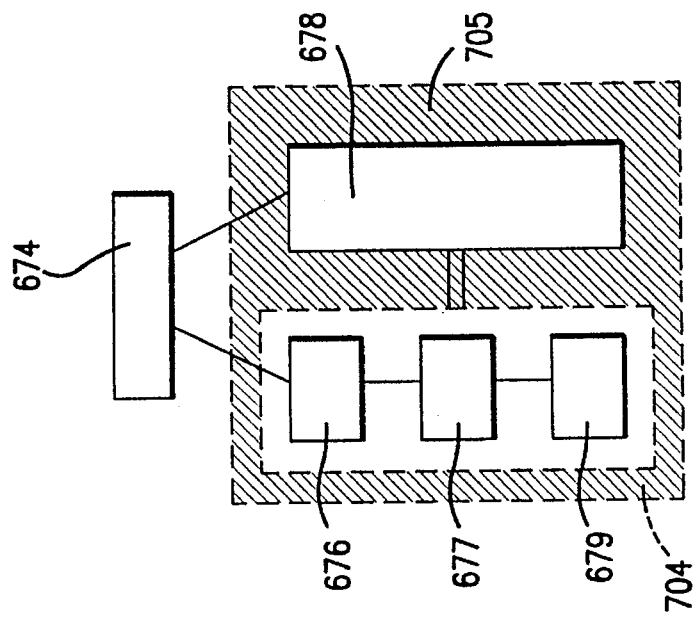
FIGS. 40–42 show how original document elements are grouped into pseudo-elements.
Figure 41:
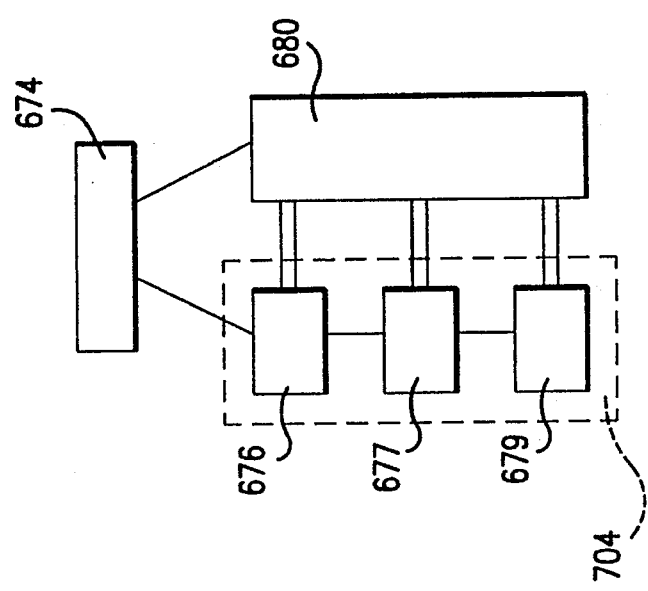
Figure 40:
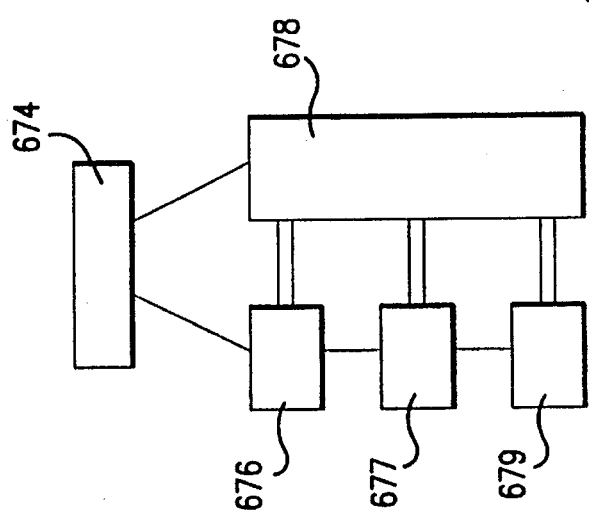

FIGS. 40–42 show how a somewhat more complicated model document is analyzed to form all of the necessary pseudo-elements 700. A first pseudo-element 704 is formed from the document elements. A second pseudo-element 705 is formed from the first pseudo-element 704 and the document element 678.

Once the pseudo-elements 700 are formed in step S2040, an expression pattern which represents a top-level relationship between the document elements 670 and the pseudo-elements 700 of the model document is formed in step S2050. The top-level expression pattern is a list of spacings, or gap widths, between adjacent ones of the document elements 670 and the pseudo-elements 700, as shown in FIG. 43. A permissible range for each spacing between adjacent ones of the document elements 670 and the pseudo-elements 700 is determined for each white space.

Next, in step S2060, the current level is checked to see if it has any pseudo-elements which need their own levels. If so, control returns to step S2050 for generation of the next level expression patterns for each pseudo pattern of the current level. Otherwise, once the current level fails to have any pseudo-elements, control continues to step S2070.

In step S2070, the minor relationships between the document elements 670 are defined. Then, in step S2080, the top-level and all of the sublevel expressions patterns are stored into the memory 410 as the regular expressions for the structural model. Finally, in step S2090, the process for defining a structural model and generating the regular expressions ends. Should any additional structural models need to be generated, this process can of course be repeated.

Once a set of one or more structural models is stored into the memory 410, an unanalyzed document image 601 can be analyzed using the process of FIG. 47 to determine if the unanalyzed document image 601 matches any of the stored structural models. FIG. 47 shows one preferred embodiment of this process. Starting in step S2100, in step S2200, the document image data of an unanalyzed document image 601 is input, either through the remote interface 520 or the scanner 200. In step S2300, the major white regions 660 are extracted from the unanalyzed document image 601 using the process of steps S100–S150 shown in FIG. 8.

In step S2400, the geometric relationships are determined for the white regions 660 in the unanalyzed document image 601. Then, in step S2500, the matching structural model is identified. Then, in step S2700, the logical tags for the document elements in the unanalyzed document image 601 are assigned based on the matching structural model to finish analyzing and identifying the document image 601. Then, in step S2800, the process ends.

Figure 48A:
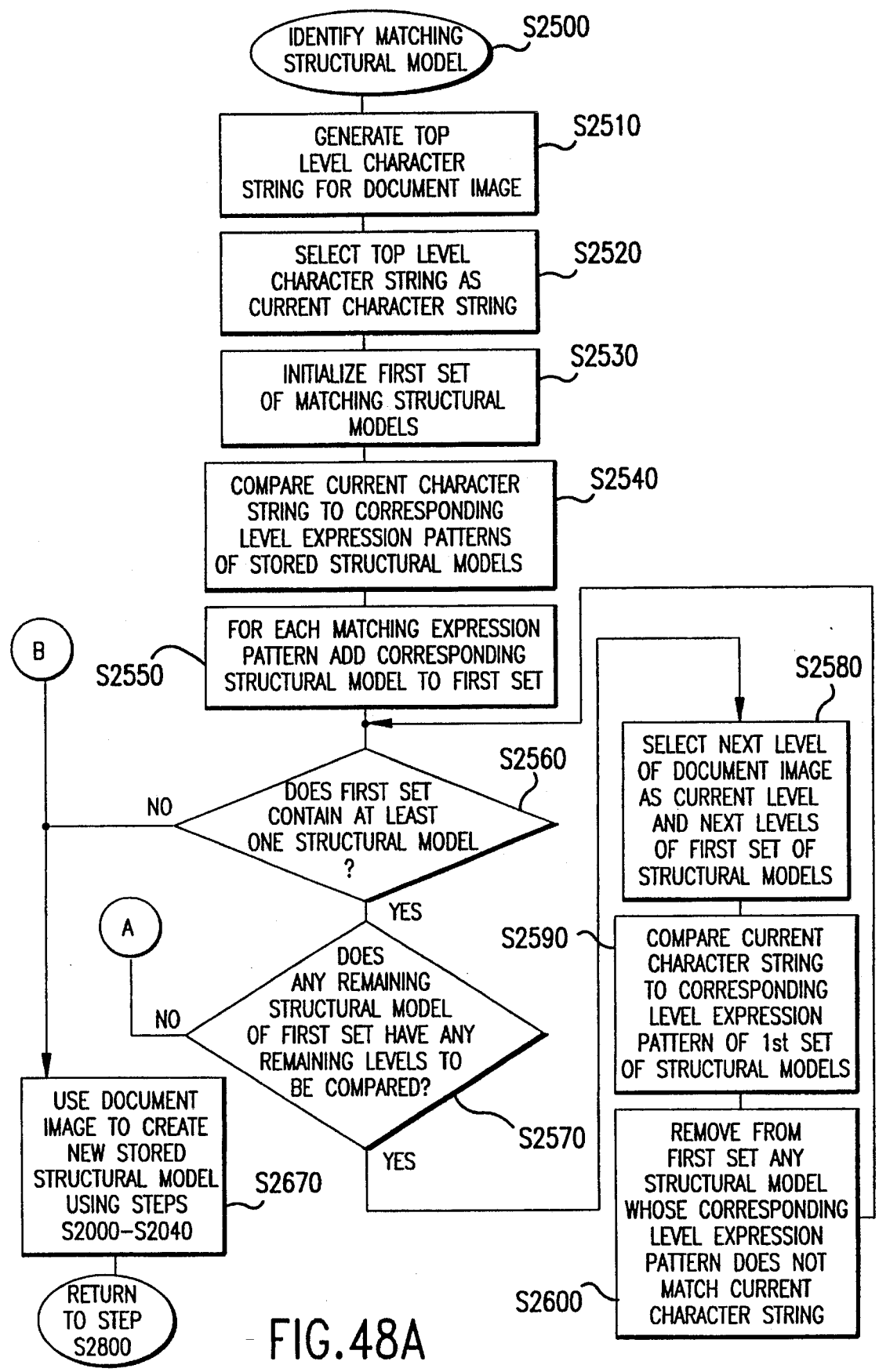
FIGS. 48A and 48B is a flowchart of one preferred embodiment of the method for identifying a most-similar structural model.
Figure 48B:
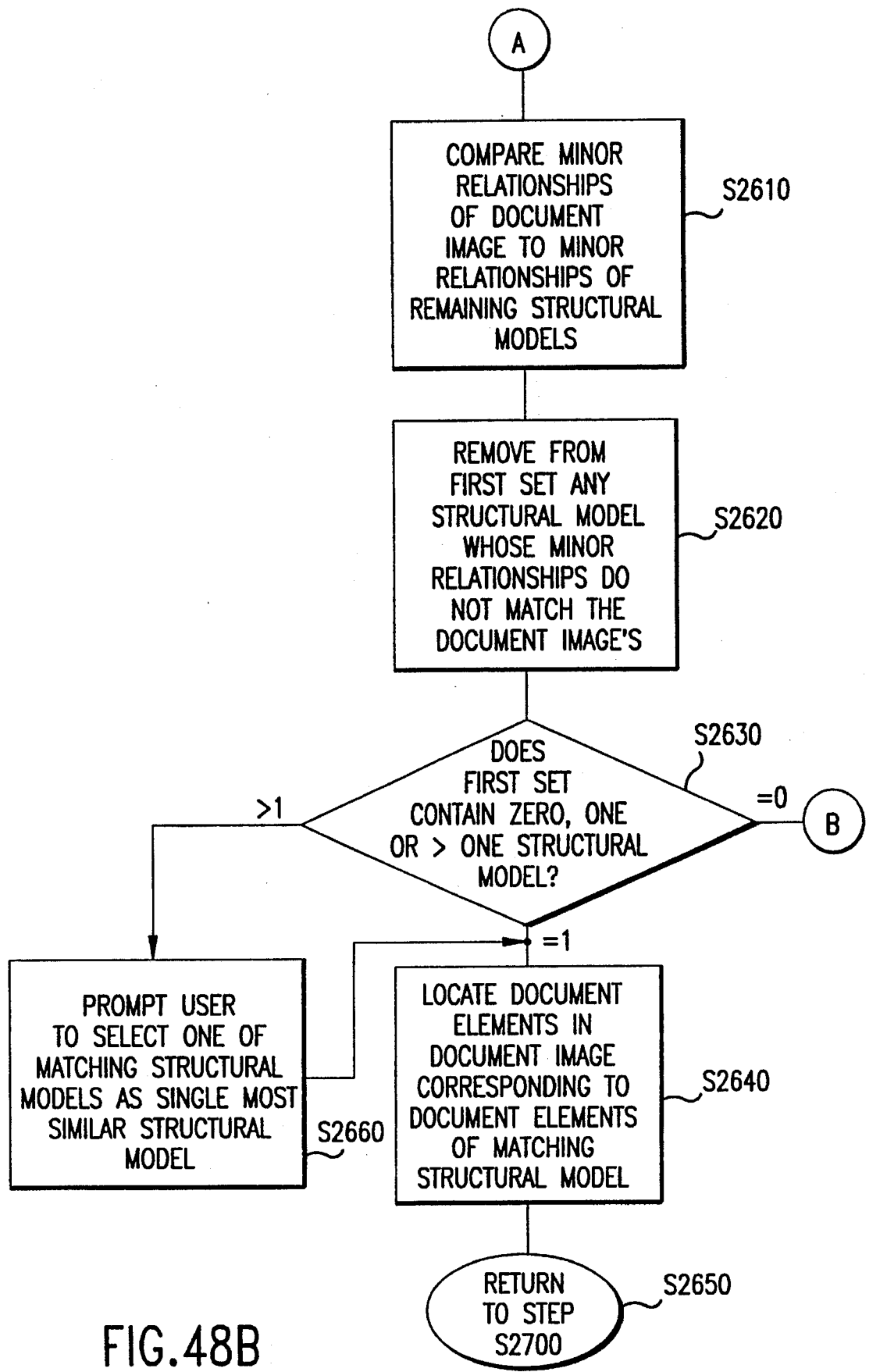

As shown in FIGS. 48A–B, step S2500 of identifying a structural model which matches the unanalyzed document image 601 begins in step S2510, where a top-level character string is generated for the unanalyzed document image 601 from the geometric relationships determined in step S2400. The sizes of the major white regions 660 of the unanalyzed document image 601 are used to generate the top-level character string. In FIG. 44, the top-level character string for the unanalyzed document image 601 is "afeb". This top-level character string denotes the actual spacing between the four document elements 670 and the single pseudo-element 700 of the sample unanalyzed document image 601. The top level character string of the unanalyzed document image 601 is generated by drawing a bounding box around the entire image area of the analyzed document image 601. Only the major white regions which extend perpendicularly to the dimension of the one-dimensional top level are used. Thus, if the one-dimensional top level uses only the above-below relationship, only the horizontal major white regions are selected. Likewise, if the top level uses only the left-right relationship, only the vertical major white regions are selected. Then, of the selected major white regions, only those major white regions which extend across the bounding box drawn around the entire image region of the unanalyzed document image 601 are further selected. Then, bounding boxes are drawn around each region separated by the further selected major white regions and the size of each of the further selected major white regions is determined by measuring the distance between the top and bottom edges of adjacent ones of the bounding boxes.

Then, a character code is assigned to each further selected major white region according to its measured size. These character codes are then concatenated into the top level character string. It should also be appreciated that this process would be repeated for each second or further level, such as when analyzing the pseudo-element 700 of the sample unanalyzed document image 601. Then, in step S2520, the top level character string of the unanalyzed document image 601 is selected as the current character string and the corresponding level expression pattern of each of the set of storage structural models is selected.

Then, in step S2530, a first set of matching structural models is initialized. In step S2540, the current-level character string of the unanalyzed document image 601 is compared to the current-level expression pattern of each of the set of stored structural models. In step S2550, each current-level expression pattern which matches the current-level character string of the unanalyzed document image 601, the corresponding structural model is added to the first set.

Next, in step S2560, the first set is checked to determine whether it contains one or more matching structural models. If the first set does not contain at least one matching structural model, control jumps from step S2560 to step S2700 where the user generates a new structural model from the unanalyzed document image 601. If the first set contains one or more structural models, control continues to step S2570, where the geometric relationships determined in step S2400 are checked to determine if a next level exists in the any of the structural models remaining in the first set.

If another level exists in any of the structural models remaining in the first set, control continues to step S2580, where the next level of the unanalyzed document image 601 is selected as the current level of the unanalyzed document image 601 and the corresponding next levels of the first set of matching structural models are selected. Then, in step S2590, the current level expression patterns for each of the structural models of the first set are compared against the current level of character string of the unanalyzed document image 601. Of course, if there are more than one pseudo-elements in the current level of the unanalyzed document image 601, there will be more than one current level character string. In this case, each current level character string of the unanalyzed document image 601 is matched against its corresponding current level expression pattern for each structural model of the first set. In step S2600, any structural model whose current level expression pattern (or patterns) does not match the current level of character string (or strings) of the unanalyzed document image 601 is removed from the first set. Then, control returns to step S2560.

If, in step S2570, no next level exists in any of the structural models remaining in the first set, control jumps to step S2610, where the minor relationships in the unanalyzed document image 601 are compared against the minor relationships in each of the structural models remaining in the first set. Then, in step S2620, each structural model whose minor relationships do not match any minor relationships of the unanalyzed document image 601 are removed from the first set. Then, in step S2630, the first set is checked to see if it contains zero, one or more than one structural model. If the first set contains zero structural models, control again jumps to step S2670. If the first set contains exactly one structural model, control continues to step S2640, where the element areas in the unanalyzed document image 601 which correspond to the document element definitions in the matching structural model are located. Then, in step S2650, control returns to step S2700, where the logical tag assigning means 500 assigns the logical tags 690 defined in the matching structural model to the located document elements in the unanalyzed document image 601.

If, however, two or more structural models remain in the first set, control jumps from step S2630 to step S2660, where the logical tag assigning means 500 prompts the user, through the user interface 510, to choose the correct matching structural model by showing the results that would be achieved if each remaining structural model in the first set were used as the matching structural model. Once the user has selected a matching structural model in step S2660, control jumps back to step S2640, where the document element areas of the unanalyzed document image 601 are located. Control then continues to step S2650, which returns control to step S2700, where the logical tag assigning means 500 assigns logical tags 690 to the located document elements of the unanalyzed document image 601 using the selected matching structural model.

In step S2670, since no storage structural model matches the unanalyzed document image 601, the structural model definition support means 450 prompts the user to use the unanalyzed document image 601 as a model document for creating a new structural model to be stored in the memory 410. Once the new structural model is created, control returns to step S2800.

As shown in FIGS. 44 and 45, assuming the structural model of FIG. 45 is the matching structural model for the unanalyzed document image 601 of FIG. 44, the first document element 670 in the actual image 601 will be assigned the logical tag 690 "Header". Accordingly, the second, third, and fourth document elements 670 will be assigned the logical tags 690 "Title", "Author", and "Body", respectively. The document elements 670 relating to the page number and footer in the sample document image 600 are likewise tagged "Page num" and "Footer".

The preceding description of a preferred embodiment of the invention is for illustration purposes only. One of skill in the art will appreciate that the invention can be included in a variety of data processing configurations. Therefore, the preceding description is not intended to be exhaustive or to limit the invention's application.

What is claimed is:

1. A method for logically identifying document elements in a document image, comprising the steps of:

storing a set of at least one predetermined structural model, each structural model in the set defining relationships between document elements of a corresponding model document;

identifying major background regions in the document image:

defining relationships between the major background regions in the document image;

converting the defined relationships of the major background regions in the document image into nested one-dimensional relationships by selecting coextensive major background regions extending perpendicular to a direction of each level of the nested one-dimensional relationships;

hierarchically comparing the nested one-dimensional relationships of the document image with the relationships of each structural model in the set;

determining if the nested one-dimensional relationships of the document image match the relationships of at least one structural model in the set;

selecting at least one matching structural model if the nested one-dimensional relationships of the document image match the relationship of the at least one structural model in the set to form a matching set of at least one structural model;

identifying a most similar matching structural model from the matching set most similar to the relationships in the document image; and assigning appropriate logical tags to identify at least one of the document elements between the major background regions of the document image based on predetermined logical tags assigned to the document elements of the most similar matching structural model.

2. The method of claim 1, wherein the step of defining relationships between the element areas in the document image comprises the step of identifying a major relationship between at least one pair of element areas lying between the major background regions.

3. The method of claim 2, wherein the at least one major relationship comprises one of an above-below relationship and a left-right relationship.

4. The method of claim 1, wherein the step of defining relationships between element areas in the document image comprises the step of identifying minor relationships between the areas lying between the major background regions.

5. The method of claim 4, wherein the minor relationships comprise at least one of left-justified, right-justified, centered, and indented.

6. The method of claim 1, wherein the geometric relationships of the document image and the structural models are each defined as a nested hierarchy of one-dimensional relationships.

7. The method of claim 1, wherein the relationships define sizes of the major background regions.

8. A method of logically identifying document elements in a document image, comprising the steps of:

storing a set of at least one predetermined structural model, each structural model defining at least one level of a nested one-dimensional hierarchy of relationships defining separations between document elements of a corresponding model document;

identifying major background regions in the document image;

defining relationships between the identified major background regions of the document image;

converting the defined relationships of the document image into at least one level of a nested one-dimensional hierarchy of relationships by selecting coextensive major background regions extending perpendicular to a direction of each of the at least one level of the nested one-dimensional hierarchy of relationships;

selecting a top level of relationships of the at least one level of relationships of the document image as a current document image level;

selecting a top level of relationships of the at least one level of relationships for the at least one stored structural model to form a set of current structural model levels;

comparing the current document image level to each current structural model level of the set of current structural model levels;

selecting each structural model whose current level matches the current document image level to form a set of matching structural models;

determining if any additional document image levels exist;

if so, selecting a next document image level as the current document image level and selecting a corresponding next level for each of the set of matching structural models as the current structural model level to reform the set of current structural models;

repeating the comparing step through the next document image level selecting step until no additional document image levels exist;

determining if a single selected structural model exists or a plurality of selected structural models exist;

if a plurality of selected structural models exists, selecting a most similar one of the selected structural models that is most similar to the defined relationships of the document image as the single selected structural model; and identifying the document elements of the document image based on logical tags of the single selected structural model.

9. The method of claim 8, wherein the step of defining relationships between the major background regions in the document image comprises the step of identifying a major relationship between at least one pair of document element areas lying between the major background regions.

10. The method of claim 9, wherein the at least one major relationship comprises one of an above-below relationship and a left-right relationship.

11. The method of claim 8, wherein the step of defining relationships between the major background regions in the document image comprises the step of identifying minor relationships between the document element areas lying between the major background regions.

12. The method of claim 11, wherein the minor relationships form a bottom most level of each structural model and a bottom most level of the document image.

13. The method of claim 11, wherein the minor relationships comprise at least one of left-justified, right-justified, centered, and indented.

14. The method of claim 8, further comprising the steps of:

determining, after the structural model selecting step, if no structural models were selected; and if so, using the document image to form a new structural model.

15. The method of claim 8, wherein the storing step further comprises storing a regular expression for each level of each stored structural model.

16. The method of claim 15, wherein the converting step further comprises generating a document expression for each level of the document image.

17. The method of claim 16, wherein the comparing step comprises comparing the document expression corresponding to the current document image level to the regular expression corresponding to the current structural model level for each structural model.

18. The method of claim 8, wherein the storing step comprises the steps of:

generating a top-level expression pattern of background regions for each of the at least one structural model based on corresponding structural model document image document elements;

identifying pseudo-elements in the top-level expression pattern for each at least one structural model;

generating a second or greater level expression pattern of background regions for each of the pseudo-elements in said each of the at least one structural model;

identifying minor document element characteristics for each of the document elements of each of the at least one structural model; and generating minor relationships of background regions for each of the document elements of each of the at least one structural model.

19. A document element identifying system for logically identifying document elements of a document image, comprising:

a memory for storing a plurality of stored structural models, each of the stored structural models comprising a regular expression;

a document background region extraction system;

major background region selecting means for selecting some major background regions extracted by the document background region extraction system from the document image and for generating a nested one-dimensional document expression for the selected major background regions wherein the selected major background regions coextensively extend perpendicular to a direction of each level of the nested one-dimensional document expression;

regular expression matching means for hierarchically comparing the nested one-dimensional document expression to the regular expression of each of the plurality of stored structural models;

matching means for identifying a single matching stored structural model based on the results of the comparison by the regular expression matching means;

logical tag assigning means for assigning logical tags to identify the document elements of the document image based on the single matching stored structural model; and a processor controlling the document background region extraction system, the major background region selecting means, the logical tag assigning means, the matching means and the memory.

* * * * *